(12) United States Patent
Shen

(10) Patent No.: US 10,615,860 B2
(45) Date of Patent: Apr. 7, 2020

(54) CSI REPORTING IN A WIRELESS COMMUNICATION SYSTEM

(71) Applicant: Lenovo Innovations Limited (Hong Kong), Hong Kong (CN)

(72) Inventor: Zukang Shen, Beijing (CN)

(73) Assignee: LENOVO INNOVATIONS LIMITED (HONG KONG), Hong Kong (CN)

( * ) Notice: Subject to any disclaimer, the term of this patent is extended or adjusted under 35 U.S.C. 154(b) by 24 days.

(21) Appl. No.: 15/774,184

(22) PCT Filed: Nov. 6, 2015

(86) PCT No.: PCT/CN2015/093974
§ 371 (c)(1),
(2) Date: May 7, 2018

(87) PCT Pub. No.: WO2017/075802
PCT Pub. Date: May 11, 2017

(65) Prior Publication Data
US 2018/0331743 A1    Nov. 15, 2018

(51) Int. Cl.
*H04B 7/06* (2006.01)
*H04W 24/10* (2009.01)
(Continued)

(52) U.S. Cl.
CPC ......... *H04B 7/0626* (2013.01); *H04B 7/0417* (2013.01); *H04W 24/10* (2013.01);
(Continued)

(58) Field of Classification Search
None
See application file for complete search history.

(56) References Cited

U.S. PATENT DOCUMENTS

2012/0140649 A1\* 6/2012 Choudhury ........... H04W 24/10
                                                              370/252
2013/0250903 A1\* 9/2013 Ahn .................. H04W 72/0413
                                                              370/329
(Continued)

FOREIGN PATENT DOCUMENTS

CN     101932116 A    12/2010
JP     2008301253 A   12/2008
WO     2013/145787 A1 10/2013

OTHER PUBLICATIONS

PCT/CN2015/093974 "International Search Report", dated Aug. 2, 2016, pp. 1-3.
(Continued)

*Primary Examiner* — Chi H Pham
*Assistant Examiner* — Vladislav Y Agureyev
(74) *Attorney, Agent, or Firm* — Kunzler Bean & Adamson

(57) ABSTRACT

Apparatuses, methods, and systems are disclosed for CSI reporting. One apparatus includes a processor that determines a priority for each channel state information ("CSI") report of multiple CSI reports. In certain embodiments, the priority for each CSI report is determined based on each of a CSI report type, a serving cell, a CSI process identification ("ID"), and a CSI subframe set of the CSI report. In various embodiments, the processor determines one or more CSI reports of the multiple CSI reports to be transmitted in a subframe based at least partly on the priority for each CSI report. In certain embodiments, the processor selects a channel for transmitting the one or more CSI reports in the subframe. In various embodiments, the apparatus includes a transmitter that transmits the one or more CSI reports using the selected channel in the subframe.

20 Claims, 8 Drawing Sheets

(51) Int. Cl.
  *H04B 7/0417* (2017.01)
  *H04W 72/04* (2009.01)
(52) U.S. Cl.
  CPC ......... *H04W 72/0446* (2013.01); *H04B 7/063* (2013.01); *H04B 7/0632* (2013.01); *H04B 7/0639* (2013.01)

(56) References Cited

U.S. PATENT DOCUMENTS

| | | | |
|---|---|---|---|
| 2013/0258874 A1* | 10/2013 | Khoshnevis | H04L 5/0057 370/252 |
| 2013/0322376 A1* | 12/2013 | Marinier | H04W 72/06 370/329 |
| 2014/0036664 A1* | 2/2014 | Han | H04W 4/70 370/230 |
| 2014/0036704 A1* | 2/2014 | Han | H04W 28/12 370/252 |
| 2014/0269383 A1* | 9/2014 | He | H04W 28/24 370/252 |
| 2015/0155928 A1* | 6/2015 | Seo | H04L 5/0053 370/329 |
| 2016/0183244 A1* | 6/2016 | Papasakellariou | H04L 5/001 370/329 |
| 2016/0301515 A1* | 10/2016 | Ouchi | H04L 5/0057 |
| 2017/0006491 A1* | 1/2017 | Chen | H04B 7/024 |
| 2017/0048740 A1* | 2/2017 | Yang | H04B 7/26 |
| 2017/0310441 A1* | 10/2017 | Wei | H04B 7/0626 |
| 2018/0198497 A1* | 7/2018 | Wei | H04B 7/0639 |
| 2018/0255544 A1* | 9/2018 | Xiao | H04L 1/0031 |

OTHER PUBLICATIONS

PCT/CN2015/093974 "Written Opinion of the International Searching Authority", dated Aug. 2, 2016, pp. 1-4.

\* cited by examiner

CSI REPORTING IN A WIRELESS COMMUNICATION SYSTEM

FIELD

The subject matter disclosed herein relates generally to wireless communications and more particularly relates to channel state information ("CSI") reporting in a wireless communications system.

BACKGROUND

The following abbreviations are herewith defined, at least some of which are referred to within the following description.

3GPP Third Generation Partnership Project
ACK Positive-Acknowledgment
ANDSF Access Network Discovery and Selection Function
AP Access Point
APN Access Point Name
BLER Block Error Ratio
BPSK Binary Phase Shift Keying
CAZAC Constant Amplitude Zero Auto Correction
CCA Clear Channel Assessment
CCE Control Channel Element
CP Cyclic Prefix
CQI Channel Quality Indicator
CSI Channel State Information
CSS Common Search Space
DCI Downlink Control Information
DL Downlink
eNB Evolved Node B
EPDCCH Enhanced Physical Downlink Control Channel
E-RAB E-UTRAN Radio Access Bearer
ETSI European Telecommunications Standards Instate
E-UTRAN Evolved Universal Terrestrial Radio Access Network
FBE Frame Based Equipment
FDD Frequency Division Duplex
FDMA Frequency Division Multiple Access
FEC Forward Error Correction
GPRS General Packet Radio Service
GPT GPRS Tunneling Protocol
HARQ Hybrid Automatic Repeat Request
H-PLMN Home Public Land Mobile Network
IP Internet Protocol
ISRP Inter-System Routing Policy
LAA licensed Assisted Access
LBE Load Based Equipment
LBT Listen-Before-Talk
LTE Long Term Evolution
MCL Minimum Coupling Loss
MCS Modulation and Coding Scheme
MME Mobility Management Entity
MU-MIMO Multi-User, Multiple-Input, Multiple-Output
NACK or NAK Negative-Acknowledgment
NAS Non-Access Stratum
NBIFOM Network-Based IP Flow Mobility
OFDM Orthogonal Frequency Division Multiplexing
PCell Primary Cell
PBCH Physical Broadcast Channel
PCO Protocol Configuration Options
PCRF Policy and Charging Rules Function
PDCCH Physical Downlink Control Channel
PDCP Packet Data Convergence Protocol
PDN Packet Data Network
PDSCH Physical Downlink Shared Channel
PDU Protocol Data Unit
PGW Packet Data Network Gateway
PHICH Physical Hybrid ARQ Indicator Channel
PLMN Public Land Mobile Network
PMI Precoding Matrix Indicator
PRACH Physical Random Access Channel
PUB Physical Resource Block
PTI Procedure Transaction Identity
PUCCH Physical Uplink Control Channel
PUSCH Physical Uplink Shared Channel
QoS Quality of Service
QPSK Quadrature Phase Shift Keying
RAB Radio Access Bearer
RAN Radio Access Network
RAR Random Access Response
RI Rank Indicator
RRC Radio Resource Control
RX Receive
SC-FDMA Single Carrier Frequency Division Multiple Access
SCell Secondary Cell
SCH Shared Channel
SGW Serving Gateway
SIB System Information Block
SINR Signal-to-Interference-Plus-Noise Ratio
SR Scheduling Request
TAU Tracking Ares Update
TB Transport Block
TBS Transport Block Size
TCP Transmission Control Protocol
TDD Time-Division Duplex
TDM Time Division Multiplex
TEID Tunnel Endpoint Identification ("ID")
TX Transmit
UCI Uplink Control Information
UE User Entity/Equipment (Mobile Terminal)
UL Uplink
Universal Mobile Telecommunications System
V-PLMN Visited Public Land Mobile Network
WiMAX Worldwide Interoperability for Microwave Access
WLAN Wireless Local Area Network In wireless communications networks, carrier aggregation may be supported. In such a configuration, a UE may be configured to report CSI periodically for each serving cell, in the form of one or more CSI processes. As may be appreciated, CSI may generally include CQI, PMI, and RI. Based on higher layer configuration, one of the following periodic CSI report types may be generated for each periodic CSI reporting instance for each CSI process: Type 1 report supports CQI feedback for the UE selected sub-hands; Type 1a report supports subband CQI and second PMI feedback; Type 2, Type 2b, and Type 2c reports support wideband CQI and PMI feedback; Type 2a report supports wideband PMI feedback; Type 3 report supports RI feedback; Type 4 report supports wideband CQI; Type 5 report supports RI and wideband PMI feedback; and Type 6 report supports RI and PTI feedback.

In certain systems, the periodic CSI reporting instance (e.g., the sub frame in which periodic CSI of a CSI process is reported) is configured according to higher layer signaling independently for each CSI process. Moreover, only one periodic CSI report corresponding to one CSI process is transmitted in a subframe by a UE, irrespective of the number of serving cells and CSI processes configured for the UE. In situations in which multiple periodic CSI reports corresponding to multiple CSI processes of a UE are configured to be transmitted in the same subframe, the UE selects one of the multiple CSI reports for transmission.

In various systems, multiple periodic CSI reports corresponding to multiple CSI processes may be transmitted in a subframe by a UE. These multiple periodic CSI reports may be transmitted using a PUCCH. As may be appreciated, a maximum payload size of the PUCCH is limited depending on the structure of the PUCCH and the channel condition between the UE and the eNB. In situations in which a total payload size of the CSI reports in a subframe exceed the maximum payload size of the PUCCH, periodic CSI report(s) of one or more of the multiple periodic CSI reports are dropped.

In certain situations, a UE may be configured with more than one PUCCH for transmission of multiple periodic CSI reports. These multiple PUCCHs may support different maximum payload sixes. The UE may select one of the multiple PUCCHs for transmission of the multiple periodic CSI reports. If a maximum payload size of a selected PUCCH cannot accommodate all periodic CSI reports in a subframe, periodic CSI report(s) of one or more of the multiple periodic CSI reports are dropped.

Moreover, a UE may be configured to transmit HARQ-ACK and multiple periodic CSI reports using one PUCCH. However, if a maximum payload size of the PUCCH cannot accommodate all periodic CSI reports and HARQ-ACK in a subframe, periodic CSI report(s) of one or more of the multiple periodic CSI reports are dropped. As may be appreciated, HARQ-ACK may refer collectively to positive acknowledge ("ACK") and negative acknowledge ("NAK") to a received DL TB. In certain configurations, the DL TBs may be carried on the PDSCH. Moreover, a maximum of two TBs may be transmitted on PDSCH in one serving cell and in a subframe.

BRIEF SUMMARY

Apparatuses for CSI reporting are disclosed. Methods and systems also perform the functions of the apparatus. In one embodiment, the apparatus includes a processor that determines a priority for each channel state information ("CSI") report of multiple CSI reports. In certain embodiments, the priority for each CSI report is determined based on each of a CSI report type, a serving cell, a CSI process identification and a CSI subframe set of the CSI report. In various embodiments, the processor determines one or more CSI reports of the multiple CSI reports to be transmitted in a subframe based at least partly on the priority for each CSI report. In certain embodiments, the processor selects a channel for transmitting the one or more CSI reports in the subframe. In various embodiments, the apparatus includes a transmitter that transmits the one or more CSI reports using the selected channel in the subframe.

In one embodiment, the priority for each CSI report is determined using one of the following equations:

$P_{CSI\text{-}priority}=n\times T\times S\times M+t\times S\times M+s\times M+m,$ $P_{CSI\text{-}priority}=n\times T\times S\times S+t\times M\times S+m\times S+s,$ $P_{CSI\text{-}priority}=n\times S\times T\times M+s\times T\times M+t\times M+m,$ $P_{CSI\text{-}priority}=n\times S\times M\times T+s\times M\times T+m\times T+t,$ $P_{CSI\text{-}priority}=n\times M\times S\times T+m\times S\times T+s\times T+t,$ $P_{CSI\text{-}priority}=n\times M\times T\times S+m\times T\times S+t\times S+s,$ $P_{CSI\text{-}priority}=m\times T\times S\times N+t\times S\times N+s\times N+n,$ $P_{CSI\text{-}priority}=m\times T\times N\times S+t\times N\times S+n\times S+s,$ $P_{CSI\text{-}priority}=m\times S\times T\times N+s\times T\times N+t\times N+n,$ $P_{CSI\text{-}priority}=m\times S\times N\times T+s\times N\times T+n\times T+t,$ $P_{CSI\text{-}priority}=m\times N\times S\times T+n\times S\times T+s\times T+t,$ $P_{CSI\text{-}priority}=m\times N\times T\times S+n\times T\times S+t\times S+s,$ $P_{CSI\text{-}priority}=s\times T\times N\times M+t\times N\times M+n\times M+m,$ $P_{CSI\text{-}priority}=s\times T\times M\times N+t\times M\times N+m\times N+n,$ $P_{CSI\text{-}priority}=s\times N\times T\times M+n\times T\times M+t\times M+m,$ $P_{CSI\text{-}priority}=s\times N\times M\times T+n\times M\times T+m\times T+t,$ $P_{CSI\text{-}priority}=s\times M\times N\times T+m\times N\times T+n\times T+t,$ $P_{CSI\text{-}priority}=s\times M\times T\times N+m\times T\times N+t\times N+n,$ $P_{CSI\text{-}priority}=t\times N\times S\times M+n\times S\times M+s\times M+m,$ $P_{CSI\text{-}priority}=t\times N\times M\times S+n\times M\times S+m\times S+s,$ $P_{CSI\text{-}priority}=t\times S\times N\times M+s\times N\times M+n\times M+m,$ $P_{CSI\text{-}priority}=t\times S\times M\times N+s\times M\times N+m\times N+n,$ $P_{CSI\text{-}priority}=t\times M\times S\times N+m\times S\times N+s\times N+n,$ and $P_{CSI\text{-}priority}=t\times M\times N\times S+m\times N\times S+n\times S+s.$ The $P_{CSI\text{-}priority}$ is the priority for the CSI process; N is a number of different CSI report type levels; n is a CSI report type level index of the CSI report types and $0 \leq n \leq N-1$; M is a number of serving cells for a remote unit; m is a serving cell index of the CSI report md $0 \leq m \leq M-1$; S is a number of CSI processes for a serving cell and for a remote unit; s is a CSI process index of the CSI report and $0 \leq s \leq S-1$; T is a number of CSI subframe sets for a serving cell and for a remote unit; t is a CSI subframe set index of the CSI report and $0 \leq t \leq T-1$. In such an embodiment, priorities of the multiple CSI reports are ordered from highest priority to lowest priority in ascending order of $P_{CSI\text{-}priority}$.

In some embodiments, the priority between any pair of CSI reports among the multiple CSI reports is determined according to: if the two CSI reports in the pair of CSI reports have a different CSI report type level index, the CSI report with a smaller CSI report type level index is of higher priority; if the two CSI reports in the pair of CSI reports have a same CSI report type level index and a different CSI subframe set index, the CSI report with a smaller CSI subframe set index is of higher priority; if the two CSI reports in the pair of CSI reports have a same CSI report type level index, a same CSI subframe set index, and a different CSI process index, the CSI report with a smaller CSI process index is of higher priority; if the two CSI reports in the pair of CSI reports haves same CSI report type level index, a same CSI subframe set index, a same CSI process index, and a different serving cell index, the CSI report with a smaller serving cell index is of higher priority.

In some embodiments, the processor determines the one or more CSI reports of the multiple CSI report to be transmitted in the subframe by selecting CSI reports of the multiple CSI reports in order from a highest priority to a lowest priority until a size of the selected CSI reports reaches a payload size of the selected channel. In certain embodiments, the apparatus includes a receiver that receives signaling that indicates at least one channel that can be used for transmitting the one or more CSI reports in the subframe.

In one embodiment the processor selects the channel by, if a single channel is the only channel available for selection, selecting the single channel in certain embodiments, the processor selects the channel by, if the multiple channels are available for selection and if a payload size of one or more channels of the multiple channels is greater than or equal to a number of CSI report hits corresponding to the multiple CSI reports, selecting the channel with a smallest payload size from the one or more channels. In various embodiments, the processor selects the channel by, if multiple channels are available for selection and if a payload size of each channel of the multiple channels is less than a number of CSI report bits corresponding to the multiple CSI reports, selecting the channel with a largest payload size from the multiple channels.

In one embodiment, the processor determines a set of hybrid automatic repeat request acknowledgment ("HARQ-ACK") bits to be transmitted in the subframe. In such an embodiment, the processor may determine the one or more CSI reports of the multiple CSI reports to be transmitted in the subframe by selecting CSI reports of the multiple CSI reports in order from a highest priority to a lowest priority until a size of the set of HARQ-ACK bits and the selected CSI reports reaches a payload size of the selected channel. Furthermore, in such an embodiment, the transmitter transmits the one or more CSI reports using the selected channel in the subframe by transmitting the set of HARQ-ACK bits with the selected CSI reports using the selected channel.

A method for CSI reporting, in one embodiment, includes determining a priority for each channel state information ("CSI") report of multiple CSI reports. In such an embodiment, the priority for each CSI report is determined based on each of a CSI report type, a serving cell, a CSI process identification ("ID"), and a CSI subframe set of the CSI report. In various embodiments, the method may include determining one or more CSI reports of the multiple CSI reports to be transmitted in a subframe based at least partly on the priority tor each CSI report. In some embodiments, the method may include selecting a channel for transmitting the one or more CSI reports in the subframe. In one embodiment, the method may include transmitting the one or more CSI reports using the selected channel in the subframe.

In certain embodiments, the priority for each CSX report is determined using one of the following equations:

$$P_{CSI\text{-}priority}=n\times T\times S\times M+t\times S\times M+s\times M+m,$$

$$P_{CSI\text{-}priority}=n\times T\times M\times S+t\times M\times S+m\times S+s,$$

$$P_{CSI\text{-}priority}=n\times S\times T\times M+s\times T\times M+t\times M+m,$$

$$P_{CSI\text{-}priority}=n\times S\times M\times T+s\times M\times T+m\times T+t,$$

$$P_{CSI\text{-}priority}=n\times M\times S\times T+m\times S\times T+s\times T+t,$$

$$P_{CSI\text{-}priority}=n\times M\times T\times S+m\times T\times S+t\times S+s,$$

$$P_{CSI\text{-}priority}=m\times T\times S\times N+t\times S\times N+s\times N+n,$$

$$P_{CSI\text{-}priority}=m\times T\times N\times S+t\times N\times S+n\times S+s,$$

$$P_{CSI\text{-}priority}=m\times S\times T\times N+s\times T\times N+t\times N+n,$$

$$P_{CSI\text{-}priority}=m\times S\times N\times T+s\times N\times T+n\times T+t,$$

$$P_{CSI\text{-}priority}=m\times N\times S\times T+n\times S\times T+s\times T+t,$$

$$P_{CSI\text{-}priority}=m\times N\times T\times S+n\times T\times S+t\times S+s,$$

$$P_{CSI\text{-}priority}=s\times T\times N\times M+t\times N\times M+n\times M+m,$$

$$P_{CSI\text{-}priority}=s\times T\times M\times N+t\times M\times N+m\times N+n,$$

$$P_{CSI\text{-}priority}=s\times N\times T\times M+n\times T\times M+t\times M+m,$$

$$P_{CSI\text{-}priority}=s\times N\times M\times T+n\times M\times T+m\times T+t,$$

$$P_{CSI\text{-}priority}=s\times M\times N\times T+m\times N\times T+n\times T+t,$$

$$P_{CSI\text{-}priority}=s\times M\times T\times N+m\times T\times N+t\times N+n,$$

$$P_{CSI\text{-}priority}=t\times N\times S\times M+n\times S\times M+s\times M+m,$$

$$P_{CSI\text{-}priority}=t\times N\times M\times S+n\times M\times S+m\times S+s,$$

$$P_{CSI\text{-}priority}=t\times S\times N\times M+s\times N\times M+n\times M+m,$$

$$P_{CSI\text{-}priority}=t\times S\times M\times N+s\times M\times N+m\times N+n,$$

$$P_{CSI\text{-}priority}=t\times M\times S\times N+m\times S\times N+s\times N+n, \text{ and}$$

$$P_{CSI\text{-}priority}=t\times M\times N\times S+m\times N\times S+n\times S+s.$$

The $P_{CSI\text{-}priority}$ is the priority for the CSI process; N is a number of different CSI report type levels; n is a CSI report type level index of the CSI report types and $0 \leq n \leq N-1$; M is a number of serving cells tor a remote unit; m is a serving cell index of the CSI report and $0 \leq m \leq M-1$; S is a number of CSI processes for a serving cell and for a remote unit; s is a CSI process index of the CSI report and $0 \leq s \leq S-1$; T is a number of CSI subframe sets for a serving cell and for a remote unit; t is a CSI subframe set index of the CSI report and $0 \leq t \leq T-1$. In such an embodiment, priorities of the multiple CSI reports are ordered from highest priority to lowest priority in ascending order of $P_{CSI\text{-}priority}$.

In some embodiments, the priority between any pair of CSI reports among the multiple CSI reports is determined according to: if the two CSI reports in the pair of CSI reports have a different CSI report type level index, the CSI report with a smaller CSI report type level index is of higher priority; if the two CSI reports in the pair of CSI reports have a same CSI report type level index and a different CSI subframe set index, the CSI report with a smaller CSI subframe set index is of higher priority; if the two CSI reports in the pair of CSI reports have a same CSI report type level index, a same CSI subframe set index, and a different CSI process index, the CSI report with a smaller CSI process index is of higher priority; if the two CSI reports in the pair of CSI reports have a same CSI report type level index, a same CSI subframe set index, a same CSI process index, and a different serving cell index, the CSI report with a smaller serving cell index is of higher priority.

In some embodiments, determining the one or more CSI reports of the multiple CSI reports to be transmitted in the subframe includes selecting CSI reports of the multiple CSI reports in order from a highest priority to a lowest priority until a size of the selected CSI reports reaches a payload size of the selected channel. In certain embodiments, the method includes receiving signaling that indicates at least one channel that can be used for transmitting the one or more CSI reports in the subframe.

In one embodiment, selecting the channel includes, if a single channel is the only channel available for selection, selecting the single channel. In certain embodiments, selecting the channel includes, if multiple channels are available for selection and if a payload size of one or more channels of the multiple channels is greater than or equal to a number of CSI report bits corresponding to the multiple CSI reports, selecting the channel with a smallest payload size from the one or more channels. In various embodiments, selecting the channel includes, if multiple channels are available for selection, and if a payload size of each channel of the multiple channels is less than a number of CSI report bits corresponding to the multiple CSI reports, selecting the channel with a largest payload size from the multiple channels.

In one embodiment, the method includes determining a set of hybrid automatic repeat request acknowledgment ("HARQ-ACK") bits to be transmitted in the subframe. In such an embodiment determining the one or more CSI reports of the multiple CSI reports to be transmitted in the subframe includes selecting CSI reports of the multiple CSI reports in order from a highest priority to a lowest priority until a size of the set of HARQ-ACK bits and the selected CSI reports reaches a payload size of the selected channel. Furthermore, in such an embodiment, transmitting the one or more CSI reports using the selected channel in the subframe includes transmitting the set of HARQ-ACK bits with the selected CSI reports using the selected channel.

In one embodiment, an apparatus includes a receiver that receives one or more channel state information ("CSI") reports on a channel in a subframe. The apparatus may also include a processor that determines a priority for each CSI report of multiple CSI reports. In such an embodiment, the priority for each CSI report may be determined based on each of a CSI report type, a serving cell, a CSI process identification ("ID"), and a CSI subframe set of the CSI report. The processor may also determine which CSI reports of the multiple CSI reports are included in the one or more CSI reports based at least partly on the priority for each CSI report.

In certain embodiments, the priority for each CSI report is determined using one of the following equations:

$$P_{CSI\text{-}priority}=n\times T\times S\times M+t\times S\times M+s\times M+m,$$

$$P_{CSI\text{-}priority}=n\times T\times S\times S+t\times M\times S+m\times S+s,$$

$$P_{CSI\text{-}priority}=n\times S\times T\times M+s\times T\times M+t\times M+m,$$

$$P_{CSI\text{-}priority}=n\times S\times M\times T+s\times M\times T+m\times T+t,$$

$$P_{CSI\text{-}priority}=n\times M\times S\times T+m\times S\times T+s\times T+t,$$

$$P_{CSI\text{-}priority}=n\times M\times T\times S+m\times T\times S+t\times S+s,$$

$$P_{CSI\text{-}priority}=m\times T\times S\times N+t\times S\times N+s\times N+n,$$

$$P_{CSI\text{-}priority}=m\times T\times N\times S+t\times N\times S+n\times S+s,$$

$$P_{CSI\text{-}priority}=m\times S\times T\times N+s\times T\times N+t\times N+n,$$

$$P_{CSI\text{-}priority}=m\times S\times N\times T+s\times N\times T+n\times T+t,$$

$$P_{CSI\text{-}priority}=m\times N\times S\times T+n\times S\times T+s\times T+t,$$

$$P_{CSI\text{-}priority}=m\times N\times T\times S+n\times T\times S+t\times S+s,$$

$$P_{CSI\text{-}priority}=s\times T\times N\times M+t\times N\times M+n\times M+m,$$

$$P_{CSI\text{-}priority}=s\times T\times M\times N+t\times M\times N+m\times N+n,$$

$$P_{CSI\text{-}priority}=s\times N\times T\times M+n\times T\times M+t\times M+m,$$

$$P_{CSI\text{-}priority}=s\times N\times M\times T+n\times M\times T+m\times T+t,$$

$$P_{CSI\text{-}priority}=s\times M\times N\times T+m\times N\times T+n\times T+t,$$

$$P_{CSI\text{-}priority}=s\times M\times T\times N+m\times T\times N+t\times N+n,$$

$$P_{CSI\text{-}priority}=t\times N\times S\times M+n\times S\times M+s\times M+m,$$

$$P_{CSI\text{-}priority}=t\times N\times M\times S+n\times M\times S+m\times S+s,$$

$$P_{CSI\text{-}priority}=t\times S\times N\times M+s\times N\times M+n\times M+m,$$

$$P_{CSI\text{-}priority}=t\times S\times M\times N+s\times M\times N+m\times N+n,$$

$$P_{CSI\text{-}priority}=t\times M\times S\times N+m\times S\times N+s\times N+n, \text{ and}$$

$$P_{CSI\text{-}priority}=t\times M\times N\times S+m\times N\times S+n\times S+s.$$

The $P_{CSI\text{-}priority}$ is the priority for the CSI process; N is a number of different CSI report type levels; n is a CSI report type level index of the CSI report types and $0 \leq n \leq N-1$; M is a number of serving cells for a remote unit; m is a serving cell index of the CSI report and $0 \leq m \leq M-1$; S is a number of CSI processes for a serving cell and for a remote unit; s is a CSI process index of the CSI report, and $0 \leq s \leq S-1$; T is a number of CSI subframe sets for a serving cell and for a remote unit; t is a CSI subframe set index of the CSI report and $0 \leq t \leq T-1$. In such an embodiment, priorities of the multiple CSI reports are ordered from highest priority to lowest priority in ascending order of $P_{CSI\text{-}priority}$.

In some embodiments, the priority between any pair of CSI reports among the multiple CSI reports is determined according to: if the two CSI reports in the pair of CSI reports have a different CSI report type level index, the CSI report with a smaller CSI report type level index is of higher priority; if the two CSI reports in the pair of CSI reports have a same CSI report type level index and a different CSI subframe set index, the CSI report with a smaller CSI subframe set index is of higher priority; if the two CSI reports in the pair of CSI reports have a same CSI report type level index, a same CSI subframe set index, and a different CSI process index, the CSI report with a smaller CSI process index is of higher priority; if the two CSI reports in the pair of CSI reports have a same CSI report type level index, a same CSI subframe set index, a same CSI process index, and a different serving cell index, the CSI report with a smaller serving cell index is of higher priority.

In one embodiment, the processor determines which CSI reports of the multiple CSI reports are included in the one or more CSI reports by selecting CSI reports of the multiple CSI reports in order from a highest priority to a lowest priority until a number of the one or more CSI reports reaches a payload size of the channel. In certain embodiments, the apparatus includes a transmitter that transmits signaling that indicates at least one channel that can be used for transmitting the one or more CSI reports in the subframe. In various embodiments, the receiver receives a set of hybrid automatic repeat request acknowledgment ("HARQ-ACK") bits with the one or more CSI reports on the channel. In such embodiments, the processor determines which CSI reports of the multiple CSI reports are included in the one or more CSI reports by selecting CSI reports of the multiple CSI reports in order from a highest priority to a lowest priority until a size of the set of HARQ-ACK bits and a number of the one or more CSI reports reaches a payload size of the channel.

Another method for CSI reporting, in one embodiment, includes receiving one or more channel state information ("CSI") reports on a channel in a subframe. In various embodiments, the method includes determining a priority for each CSI report of multiple CSI reports. In such embodiments, the priority for each CSI report is determined based on each of a CSI report type, a serving cell, a CSI process identification ("ID"), and a CSI subframe set of the CSI report. In some embodiments, the method includes determining which CSI reports of the multiple CSI reports are included in the one or more CSI reports based at least partly on the priority for each CSI report.

In certain embodiments, the priority for each CSI report is determined using one of the following equations:

$P_{CSI\text{-}priority}=n \times T \times S \times M+t \times S \times M+s \times M+m,$ $P_{CSI\text{-}priority}=n \times T \times S \times S+t \times M \times S+m \times S+s,$ $P_{CSI\text{-}priority}=n \times S \times T \times M+s \times T \times M+t \times M+m,$ $P_{CSI\text{-}priority}=n \times S \times M \times T+s \times M \times T+m \times T+t,$ $P_{CSI\text{-}priority}=n \times M \times S \times T+m \times S \times T+s \times T+t,$ $P_{CSI\text{-}priority}=n \times M \times T \times S+m \times T \times S+t \times S+s,$ $P_{CSI\text{-}priority}=m \times T \times S \times N+t \times S \times N+s \times N+n,$ $P_{CSI\text{-}priority}=m \times T \times N \times S+t \times N \times S+n \times S+s,$ $P_{CSI\text{-}priority}=m \times S \times T \times N+s \times T \times N+t \times N+n,$ $P_{CSI\text{-}priority}=m \times S \times N \times T+s \times N \times T+n \times T+t,$ $P_{CSI\text{-}priority}=m \times N \times S \times T+n \times S \times T+s \times T+t,$ $P_{CSI\text{-}priority}=m \times N \times T \times S+n \times T \times S+t \times S+s,$ $P_{CSI\text{-}priority}=s \times T \times N \times M+t \times N \times M+n \times M+m,$ $P_{CSI\text{-}priority}=s \times T \times M \times N+t \times M \times N+m \times N+n,$ $P_{CSI\text{-}priority}=s \times N \times T \times M+n \times T \times M+t \times M+m,$ $P_{CSI\text{-}priority}=s \times N \times M \times T+n \times M \times T+m \times T+t,$ $P_{CSI\text{-}priority}=s \times M \times N \times T+m \times N \times T+n \times T+t,$ $P_{CSI\text{-}priority}=s \times M \times T \times N+m \times T \times N+t \times N+n,$ $P_{CSI\text{-}priority}=t \times N \times S \times M+n \times S \times M+s \times M+m,$ $P_{CSI\text{-}priority}=t \times N \times M \times S+n \times M \times S+m \times S+s,$ $P_{CSI\text{-}priority}=t \times S \times N \times M+s \times N \times M+n \times M+m,$ $P_{CSI\text{-}priority}=t \times S \times M \times N+s \times M \times N+m \times N+n,$ $P_{CSI\text{-}priority}=t \times M \times S \times N+m \times S \times N+s \times N+n,$ and $P_{CSI\text{-}priority}=t \times M \times N \times S+m \times N \times S+n \times S+s.$ The $P_{CSI\text{-}priority}$ is the priority for the CSI process; N is a number of different CSI report type levels; n is a CSI report type level index of the CSI report types and $0 \leq n \leq N-1$; M is a number of serving cells for a remote unit; m is a serving cell index of the CSI report and $0 \leq m \leq M-1$; S is a number of CSI processes for a serving cell and for a remote unit; s is a CSI process index of the CSI report and $0 \leq s \leq S-1$; T is a number of CSI subframe sets for a serving cell and for a remote unit; t is a CSI subframe set index of the CSI report and $0 \leq t \leq T-1$. In such an embodiment, priorities of the multiple CSI reports are ordered from highest priority to lowest priority in ascending order of $P_{CSI\text{-}priority}$.

In some embodiments, the priority between any pair of CSI reports among the multiple CSI reports is determined according to: if the two CSI reports in the pair of CSI reports have a different CSI report type level index, the CSI report with a smaller CSI report type level index is of higher priority; if the two CSI reports in the pair of CSI reports have a same CSI report type level index and a different CSI subframe set index, the CSI report with a smaller CSI subframe set index is of higher priority; if the two CSI reports in the pair of CSI reports have a same CSI report type level index, a same CSI subframe set index, and a different CSI process index, the CSI report with a smaller CSI process index is of higher priority; if the two CSI reports in the pair of CSI reports have a same CSI report type level index, a same CSI subframe set index, a same CSI process index, and a different serving cell index, the CSI report with a smaller serving cell index is of higher priority.

In one embodiment, determining which CSI reports of the multiple CSI reports are included in the one or more CSI reports includes selecting CSI sports of the multiple CSI reports in order from a highest priority to a lowest priority until a number of the one or more CSI reports reaches a payload size of the channel. In certain embodiments, the method includes transmitting signaling that indicates at least one channel that can be used for transmitting the one or more CSI reports in the subframe. In various embodiments, the method includes receiving a set of hybrid automatic repeat request acknowledgment ("HARQ-ACK") bits with the one or more CSI reports on the channel. In such embodiments, determining which CSI reports of the multiple CSI reports are included in the one or more CSI reports includes selecting CSI reports of the multiple CSI reports in order from a highest priority to a lowest priority until a size of the set of HARQ-ACK bits and a number of the one or more CSI reports reaches a payload size of the channel.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
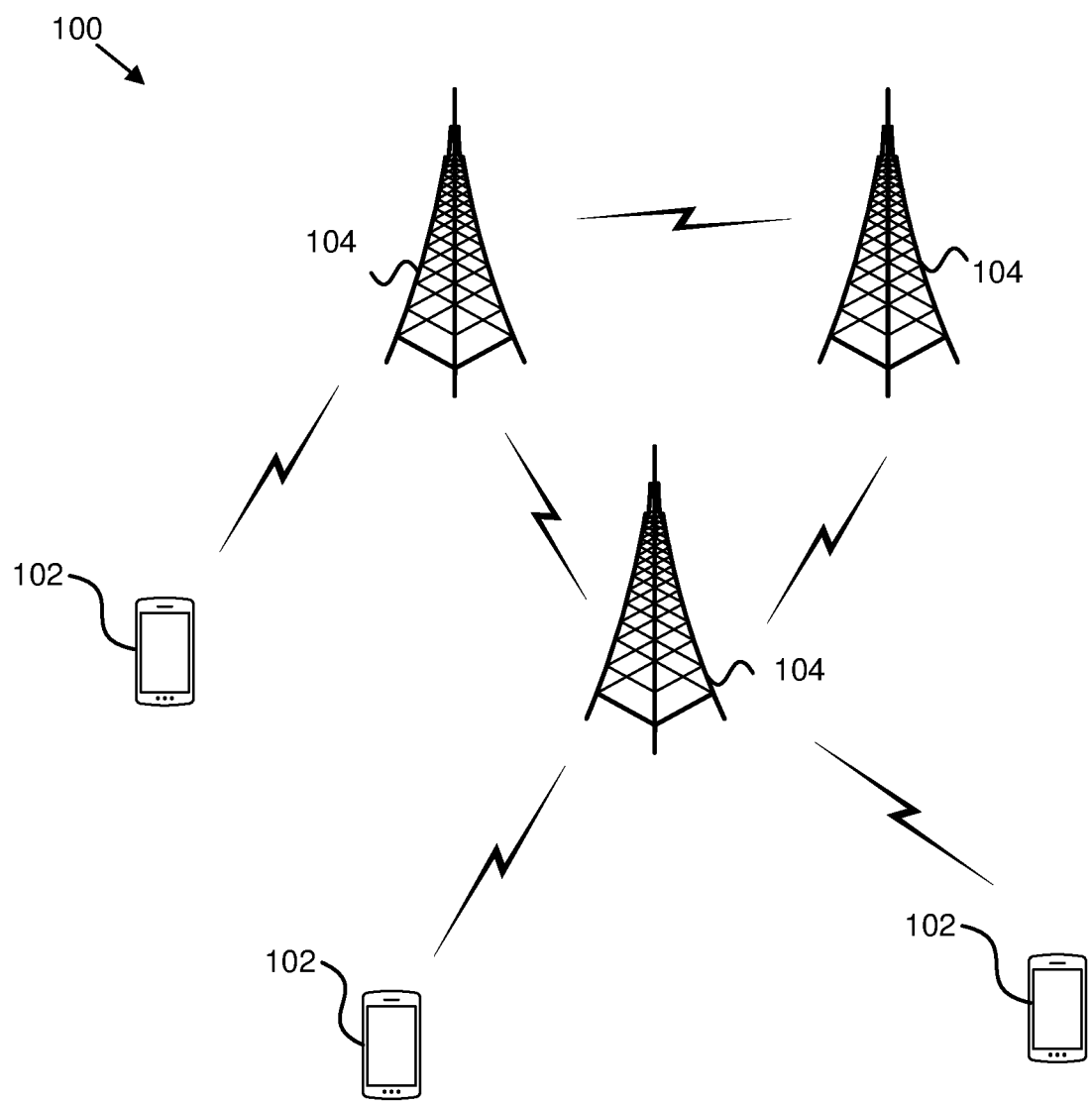
FIG. 1 is a schematic block diagram illustrating one embodiment of a wireless communication system for CSI reporting.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having" and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for CSI reporting. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a Home Node-B, a relay node, a device, or by any other technology used in the art. The base units 104 are generally part of a radio access network that includes one or more controllers communicably coupled to one or more corresponding base units 104. The radio access network is generally communicably coupled to one or more core networks, which may be coupled to other networks, like the internet and public switched telephone networks, among other networks. These and other elements of radio access and core networks are not illustrated but are well known generally by those having ordinary skill in the art.

In one implementation, the wireless communication system 100 is compliant with the LTE of the 3GPP protocol, wherein the base unit 104 transmits using an OFDM modulation scheme on the DL and the remote units 102 transmit on the UL using a SC-FDMA scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, an apparatus (e.g., UE, remote unit 102) may determine a priority for each CSI report of multiple CSI reports. In such an embodiment, the priority for each CSI report may be determined based on each of a CSI report type, a serving cell, a CSI process ID, and a CSI subframe set of the CSI report. The apparatus may also determine one or more CSI reports of the multiple CSI reports to be transmitted in a subframe based at least partly on the priority for each CSI report. Moreover, the apparatus may select a channel for transmitting the one or more CSI reports in the subframe. The apparatus may transmit the one or more CSI reports using the selected channel in the subframe. Accordingly, the apparatus may send multiple CSI reports in one subframe. In addition, the multiple CSI reports may be sent based on their overall priority as compared to all other CSI reports. Therefore, CSI reports may be sent to a base unit 104 quickly and efficiently. In various embodiments, a CSI report for a serving cell may be configured without a CSI process ID. In such embodiments, a default CSI process ID (e.g., CSI process ID of 0) may be assumed for such a CSI report. In some embodiments, a CSI process index may be assigned to a CSI process ID. In other embodiments, a CSI report for a serving cell may be configured without a CSI subframe set. In such an embodiment, a default CSI subframe set (e.g., all DL subframe of the serving cell) may be assumed for such a CSI report.

In another embodiment, an apparatus (e.g., eNB, base unit 104) may receive one or more CSI reports on a channel in a subframe. Moreover, the apparatus may determine a priority for each CSI report of multiple CSI reports. In various embodiments, the priority for each CSI report may be determined based on each of a CSI report type, a serving cell, a CSI process ID, and a CSI subframe set of the CSI report. The apparatus may also determine which CSI reports of the multiple CSI reports are included in the one or more CSI reports based at least partly on the priority for each CSI report. Accordingly, multiple prioritized CSI reports may be received by the apparatus in a single subframe, thereby facilitating quick reception of CSI reports. In various embodiments, a CSI report tor a serving cell may be configured without a CSI process ID. In such embodiments, a default CSI process ID (e.g., CSI process ID of 0) may be assumed for such a CSI report. In some embodiments, a CSI process index may be assigned to a CSI process ID. In other embodiments, a CSI report for a serving cell may be configured without a CSI subframe set. In such an embodiment, a default CSI subframe set (e.g., all DL subframe of the serving cell) may be assumed for such a CSI report.

Figure 2:
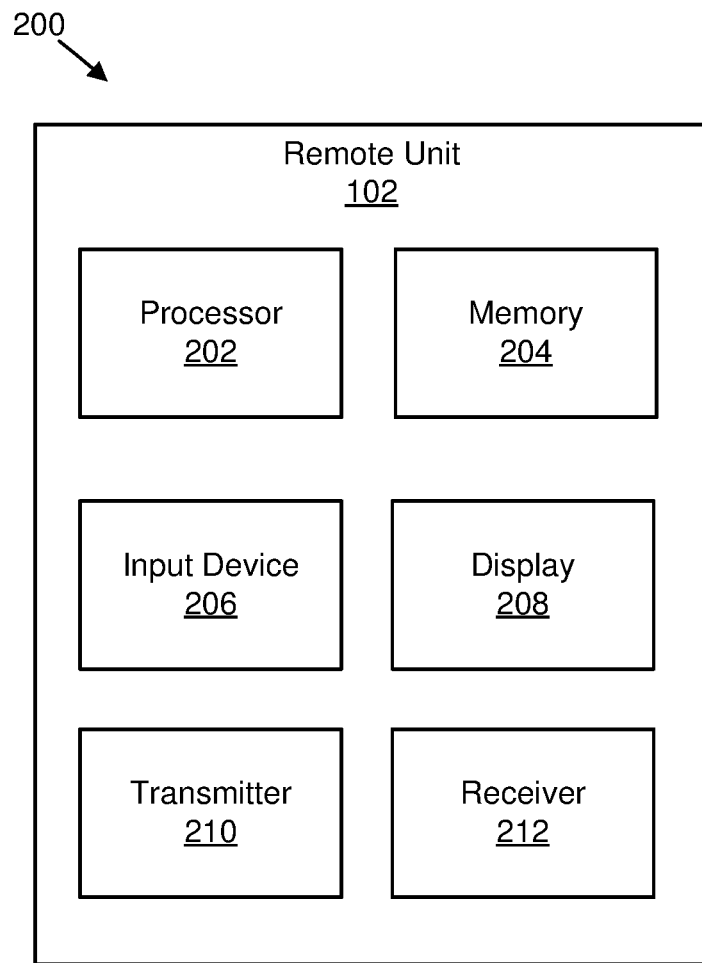
FIG. 2 is a schematic block diagram illustrating one embodiment of an apparatus that may be used for CSI reporting.

FIG. 2 depicts one embodiment of an apparatus 200 that may be used for CSI reporting. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212. In certain embodiments, the processor 202 may determine a priority for each CSI report out of multiple CSI reports. In some embodiments, the processor 202 may determine one or more CSI reports to be transmitted in a subframe based at least partly on the priority for each CSI report. In various embodiments, the processor 202 may select a channel for transmitting the one or more CSI reports in the subframe.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to information to be provided to another device. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In one embodiment the transmitter 210 is used to transmit feedback information and/or an indication to the base unit 104. For example, the transmitter 210 may be used to transmit one or more CSI reports using a selected channel in a subframe. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
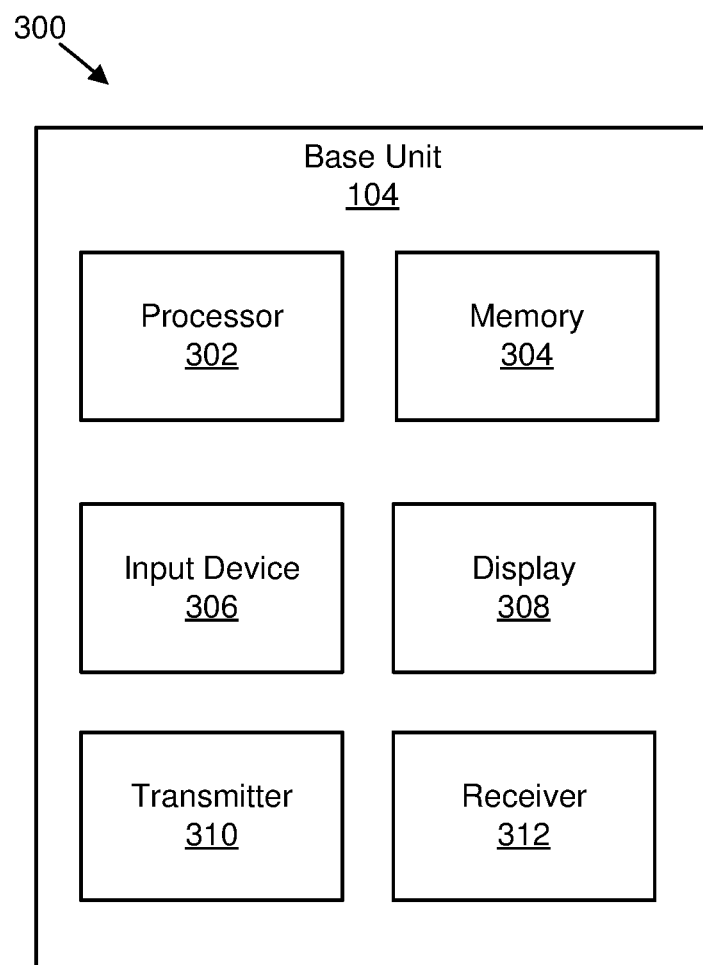
FIG. 3 is a schematic block diagram illustrating another embodiment of an apparatus that may be used for CSI reporting.

FIG. 3 depicts another embodiment of an apparatus 300 that may be used for CSI reporting. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, and the display 308 may be substantially similar to the processor 202, the memory 204, the input device 206, and the display 208 of the remote unit 102, respectively. In certain embodiments, the processor 302 may be used to determine a priority for each CSI report out of multiple CSI reports. In various embodiments, the processor 302 may be used to determine which CSI reports of the multiple CSI reports are included in one or more received reports based at least partly on the priority for each CSI report.

The transmitter 310 is used to provide DL communication signals to the remote unit 102 and the receiver 312 is used to receive UL communication signals from the remote unit 102. In certain embodiments, the receiver 312 is used to receive one or more CSI reports on a channel in a subframe.

Figure 4:
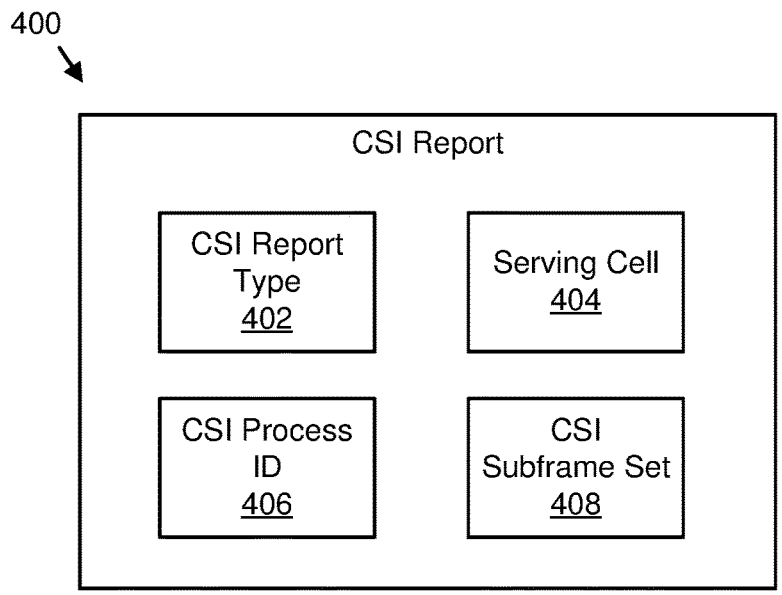
FIG. 4 is a schematic block diagram illustrating one embodiment of a CSI report.

FIG. 4 is a schematic block diagram illustrating one embodiment of a CSI report 400. The CSI report 400 includes a CSI report type 402, a serving cell 404, a CSI process ID 406, and a CSI subframe set 408. In various embodiments, a CSI report for a serving cell may be configured without a CSI process ID. In such embodiments, a default CSI process ID (e.g., CSI process ID of 0) may be assumed for such a CSI report. In some embodiments, a CSI process index may correspond to a CSI process ID. In other embodiments, a CSI report for a serving cell may be configured without a CSI subframe set. In such an embodiment, a default CSI subframe set (e.g., all DL subframe of the serving cell) may be assumed for such a CSI report.

The CSI report type 402 may include any predefined CSI report type that may define the information included in the CSI report 400. For example, CSI report types 402 may include: a Type 1 report that supports CQI feedback tor the UE selected sub-bands; a Type 1a report that supports subband CQI and second PMI feedback; Type 2, Type 2b, and Type 2c reports that support wideband CQI and PMI feedback; a Type 2a report that supports wideband PMI feedback; a Type 3 report that supports RI feedback; a Type 4 report that supports wideband CQI; a Type 5 report that supports RI and wideband PMI feedback; and a Type 6 that report supports RI and PTI feedback.

Some of the information from various CSI report types 402 may be more important than other information. Accordingly, each CSI report type 402 may have a priority relative to other CSI report types. For example, CSI report types 3, 5, and 6 may have higher priority than CSI report types 1, 1a, 2, 2a, 2b, 2c, and 4. In some embodiments, multiple CSI report types of the same priority are defined into a CSI report type level.

As may be appreciated, a remote unit 102 may be configured with multiple serving cells and each sending cell may be configured with at least one CSI process. Accordingly, the serving cell 404 indicates which serving cell the CSI report 400 corresponds to. Furthermore, a remote unit 302 may be configured with more than one CSI process for a serving cell. Therefore, the CSI process ID 406 indicates which CSI process the CSI report 400 corresponds to. Moreover, a remote unit 102 may be configured with multiple CSI subframe sets for a CSI process of a serving cell. Thus, the CSI subframe set 408 indicates which CSI subframe set the CSI report 400 corresponds to.

The priority of the CSI report 400 may be determined based on each of the CSI report type 402, the serving cell 404, the CSI process ID 406, and the CSI subframe set 408.

For the following discussion on determining priority, the following variables are used:

$P_{CSI\text{-}priority}$ is a number corresponding to the priority of a CSI report 400;

N is a number of different CSI report type levels for CSI report types 402;

n is a CSI report type level of the CSI report 400 according to the CSI report types 402 and $0 \leq n \leq N-1$;

M is a number of serving cells for a remote unit 102 (e.g., M may be a maximum number of serving cells that can be configured for a remote unit 102 or M may be a number of configured serving cells for a remote unit 102);

m is a serving cell index of the CSI report 400 according to the serving cell 404 and $0 \leq m \leq M-1$;

S is a number of CSI processes for a serving cell and for a remote unit 102 (e.g., S may be a maximum number of CSI processes that can be configured for a serving cell and for a remote unit 102 or S may be a number of CSI processes configured for a serving cell and for a remote unit 102); the number of configured CSI processes can be different for different serving cells, i.e. the value of S can be a function of serving cell index m as S(m); in the following description, the dependency of S on m is omitted for simplicity but it can be easily extended to the case where the value of S is different for different serving cells;

s is a CSI process index of the CSI report 400 according to the CSI processes (e.g., CSI process ID 406) of a serving ceil 404 and $0 \leq s \leq S-1$; if a CSI report for a serving cell is configured without a CSI process ID, a default value of s (e.g., s=0) may be assumed for the CSI report;

T is a number of CSI subframe sets for a serving cell and for a remote unit 102 (e.g., T may be a maximum number of CSI subframe sets that can be configured for a serving cell and for a remote unit 102 or T may be a number of CSI subframe sets configured for a serving cell and for a remote unit 102); the number of configured CSI subframe sets can be different for different serving cells, i.e. the value of N can be a function of serving cell index m as N(m); m the following description, the dependency of N on m is omitted for simplicity but it can be easily extended to the case where the value of N is different for different serving cells;

t is a CSI subframe set index of the CSI report 400 according to the CSI subframe set 408 of a serving cell 404 and $0 \leq t \leq T-1$; if a CSI report for a serving cell is configured without a CSI subframe set, a default value of t (e.g., t=0) may be assumed for the CSI report.

It should be noted that priorities of the multiple CSI reports may be ordered from highest priority to lowest priority in ascending order of $P_{CSI\text{-}priority}$ (e.g., a priority of 0 is a higher priority than a priority of 1, a priority of 10 is a lower priority than a priority of 5).

In one embodiment, the CSI report type 402 may have a priority level that is defined as follows; periodic CSI report types 3, 5, and 6 all have the same priority; periodic CSI report types 1, 1a, 2, 2a, 2b, 2c, and 4 all have the same priority; periodic report types 3, 5, and 6 have a higher priority than CSI report types 1, 1a, 2, 2a, 2b, 2c, and 4; n=0 for periodic CSI report types 3, 5, and 6 as a CSI report type level; and n=1 for periodic CSI report types 1, 1a, 2, 2a, 2b, 2c, and 4 as a CSI report type level.

In certain embodiments, the serving cell 404 may have a priority that is defined as follows: periodic CSI reports corresponding to a serving cell with a smaller serving cell index is of higher priority than periodic CSI reports corresponding to a serving cell with a larger serving cell index; and assuming a serving cell index i is in the range of 0 to M−1, m=i.

In various embodiments, the CSI process ID 406 may have a priority that is defined as follows: periodic CSI reports corresponding to a CSI process with a smaller CSI process ID (or CSI process index) are of a higher priority than periodic CSI reports corresponding to a CSI process with a larger CSI process ID (or CSI process index); and assuming a CSI process ID j is in the range of 0 to S−1, s=j.

In some embodiments, the CSI subframe set 408 may have a priority that is defined as follows: periodic CSI reports corresponding to a CSI subframe set with a smaller CSI subframe set index is of a higher priority than a periodic CSI report corresponding to a CSI subframe set with a larger CSI subframe set index; and assuming a CSI subframe set l is in the range of 0 to T−1, t=l.

As may be appreciated, using the defined variables, many different equations may be used to assign a priority to a CSI report 400. The following examples are some possible equations:

$$P_{CSI\text{-}priority}=n \times T \times S \times M + t \times S \times M + s \times M + m,$$

$$P_{CSI\text{-}priority}=n \times T \times M \times S + t \times M \times S + m \times S + s,$$

$$P_{CSI\text{-}priority}=n \times S \times T \times M + s \times T \times M + t \times M + m,$$

$$P_{CSI\text{-}priority}=n \times S \times M \times T + s \times M \times T + m \times T + t,$$

$$P_{CSI\text{-}priority}=n \times M \times S \times T + m \times S \times T + s \times T + t,$$

$$P_{CSI\text{-}priority}=n \times M \times T \times S + m \times T \times S + t \times S + s,$$

$$P_{CSI\text{-}priority}=m \times T \times S \times N + t \times S \times N + s \times N + n,$$

$$P_{CSI\text{-}priority}=m \times T \times N \times S + t \times N \times S + n \times S + s,$$

$$P_{CSI\text{-}priority}=m \times S \times T \times N + s \times T \times N + t \times N + n,$$

$$P_{CSI\text{-}priority}=m \times S \times N \times T + s \times N \times T + n \times T + t,$$

$$P_{CSI\text{-}priority}=m \times N \times S \times T + n \times S \times T + s \times T + t,$$

$$P_{CSI\text{-}priority}=m \times N \times T \times S + n \times T \times S + t \times S + s,$$

$$P_{CSI\text{-}priority}=s \times T \times N \times M + t \times N \times M + n \times M + m,$$

$$P_{CSI\text{-}priority}=s \times T \times M \times N + t \times M \times N + m \times N + n,$$

$$P_{CSI\text{-}priority}=s \times N \times T \times M + n \times T \times M + t \times M + m,$$

$$P_{CSI\text{-}priority}=s \times N \times M \times T + n \times M \times T + m \times T + t,$$

$$P_{CSI\text{-}priority}=s \times M \times N \times T + m \times N \times T + n \times T + t,$$

$$P_{CSI\text{-}priority}=s \times M \times T \times N + m \times T \times N + t \times N + n,$$

$$P_{CSI\text{-}priority}=t \times N \times S \times M + n \times S \times M + s \times M + m,$$

$$P_{CSI\text{-}priority}=t \times N \times M \times S + n \times M \times S + m \times S + s,$$

$$P_{CSI\text{-}priority}=t \times S \times N \times M + s \times N \times M + n \times M + m,$$

$$P_{CSI\text{-}priority}=t \times S \times M \times N + s \times M \times N + m \times N + n,$$

$$P_{CSI\text{-}priority}=t \times M \times S \times N + m \times S \times N + s \times N + n, \text{ and}$$

$$P_{CSI\text{-}priority}=t \times M \times N \times S + m \times N \times S + n \times S + s.$$

As may be appreciated, using one of the above equations will result in a priority for a CSI report 400. The same equation should be used for all CSI reports so that the priorities of the CSI reports are determined uniformly. In certain embodiments, N, M, S, and T may be defined in a specification and/or configured in hardware. For example, in one embodiment N=2, M=32, S=5, and T=2.

Each of the above equations defines a method to prioritize the multiple CSI reports by an order among a CSI report type 402, a serving cell 404, a CSI process ID 406, and a CSI subframe set 408.

For example, with $P_{CSI\text{-}priority}=n \times T \times S \times M + t \times S \times M + s \times M + m$, if the priority between any pair of CSI reports results to the following: if the two CSI reports in the pair of CSI reports have a different CSI report type level index, the CSI report with a smaller CSI report type level index is of higher priority; if the two CSI reports in the pair of CSI reports have a same CSI report type level index and a different CSI subframe set index, the CSI report with a smaller CSI subframe set index is of higher priority; if the two CSI reports in the pair of CSI reports have a same CSI report type level index, a same CSC subframe set index, and a different CSI process index, the CSI report with a smaller CSI process index is of higher priority; if the two CSI reports in the pair of CSI reports have a same CSI report type level index, a same CSI subframe set index, a same CSI process index, and a different serving cell index, the CSI report with a smaller serving cell index is of higher priority.

For another example, with $P_{CSI\text{-}priority}=n \times S \times T \times M + s \times T \times M + t \times M + m$, the priority between any pair of CSI reports results to the following: if the two CSI reports in the pair of CSI reports have a different CSI report type level index, the CSI report with a smaller CSI report type level index is of higher priority; if the two CSI reports in the pair of CSI reports have a same CSI report type level index and a different CSI subframe set index, the CSI report with a smaller CSI sub frame set index is of higher priority; if the two CSI reports in the pair of CSI reports have a same CSI report type level index, a same CSI subframe set index, and a different CSI process index, the CSI report with a smaller CSI process index is of higher priority; if the two CSI reports in the pair of CSI reports have a same CSI report type level index, a same CSI subframe set index, a same CSI process index, and a different serving cell index, the CSI report with a smaller serving cell index is of higher priority.

For simplicity, interpretation for other equations is omitted but it is similar to the interpretation of each of the above equations.

Figure 5:
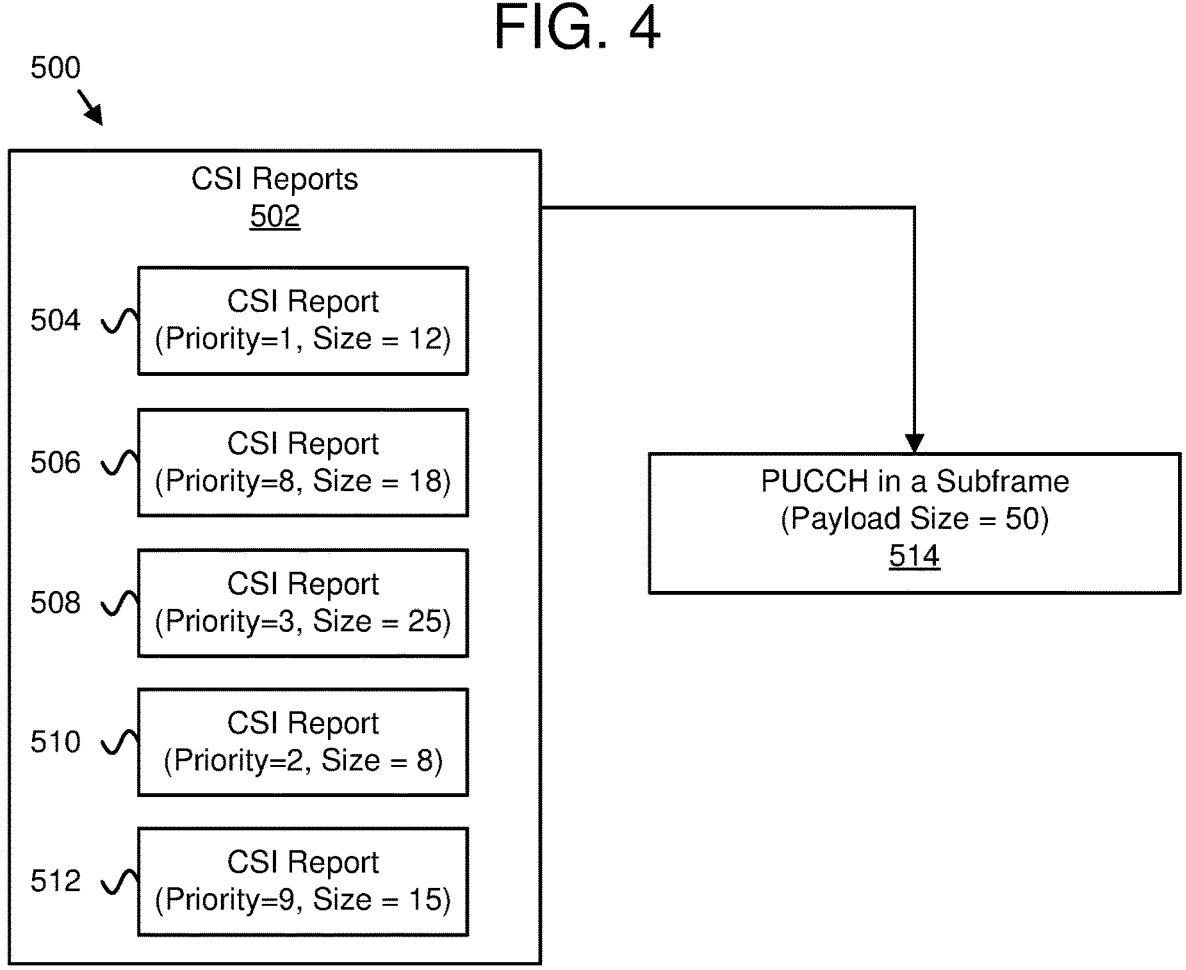
FIG. 5 is a schematic block diagram illustrating one embodiment of a system for selecting CSI reports to be transmitted.

FIG. 5 is a schematic block diagram illustrating one embodiment of a system 500 for selecting CSI reports to be transmitted. The system 500 includes a set of CSI reports 502 that are available to be transmitted. Specifically, the set of CSI reports 502 includes: a CSI report 504 having a determined priority of 1 and a size of 12 bits; a CSI report 506 having a determined priority of 8 and a size of 18 bits; a CSI report 508 having a determined priority of 3 and a size of 25 bits; a CSI report 510 having a determined priority of 2 and a size of 8 bits; and a CSI report 512 having a determined priority of 9 and a size of 15 bits. The system 500 also includes a PUCCH in a subframe 514 selected to be used to transmit CSI report bits. The PUCCH in a subframe 514 has a payload size of 50 bits. As may be appreciated, the number of CSI reports, the priorities, and the sizes described herein are for exemplary purposes. As such, in various embodiments, the number of CSI reports, the priorities, and the sizes may be any suitable values.

In one embodiment, multiple CSI reports from the set of CSI reports 502 may be transmitted in the PUCCH in a subframe 514. In certain embodiments, the remote unit 102 may determine which CSI reports from the set of CSI reports 502 to transmit in the PUCCH in a subframe 514. In one embodiment, the remote unit 102 may select CSI reports from the set of CSI reports 502 in order from a highest priority to a lowest priority until a size of the selected CSI reports reaches a payload size of the PUCCH in a subframe 514. For example, the remote unit 102 may select the CSI reports 504, 510, and 508 for transmission in the PUCCH in a subframe 514 because the CSI reports 504, 510, and 508 have the highest priority of the set of CSI reports 502. Combined the CSI reports 504, 510, and 508 occupy 45 bits of the 50 available bits of the PUCCH in a subframe 514. No other CSI report of the set of CSI reports 502 will fit into the remaining 5 bits of the PUCCH in a subframe 514. Accordingly, in this example, CSI imports 504, 510, and 508 will be transmitted in the PUCCH in a subframe 514.

Figure 6:
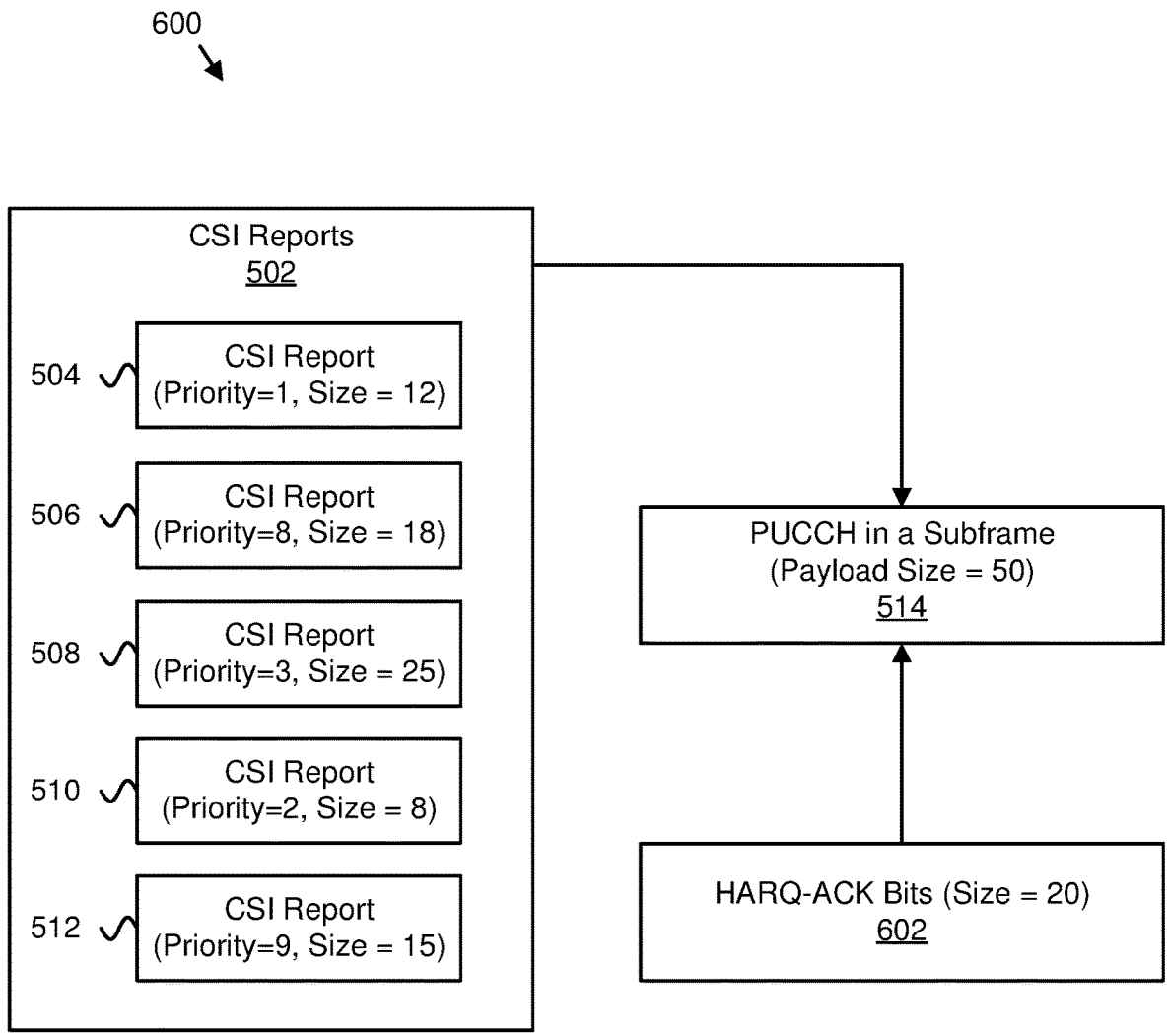
FIG. 6 is a schematic block diagram illustrating another embodiment of a system for selecting CSI reports to be transmitted.

FIG. 6 is a schematic block diagram illustrating another embodiment of a system 600 for selecting CSI reports to be transmitted. The system 600 includes the set of CSI reports 502 and the PUCCH in a subframe 514 which are similar to the set of CSI reports 502 and the PUCCH in a subframe 514 of FIG. 5. Moreover, the system 600 also includes HARQ-ACK bits 602 to be transmitted. The HARQ-ACK bits 602 has a size of 20 bits in the illustrated embodiment, while in other embodiments, the size may be any suitable size.

In certain embodiment the system 600 may determine the CSI reports of the set of CSI reports 502 for transmission by selecting the HARQ-ACK bits 602 and CSI reports in order from a highest priority to a lowest priority until the size of the HARQ-ACK bits 602 and the selected CSI reports reaches the payload size of the PUCCH in a subframe 514. In the illustrated example, the HARQ-ACK bits 602 and CSI reports 504 and 310 occupy 40 bits out of the payload size of 50 bits of the PUCCH in a subframe 514. Accordingly, the HARQ-ACK bits 602 and CSI sports 504 and 510 will be transmitted in the PUCCH in a subframe 514.

Figure 7:
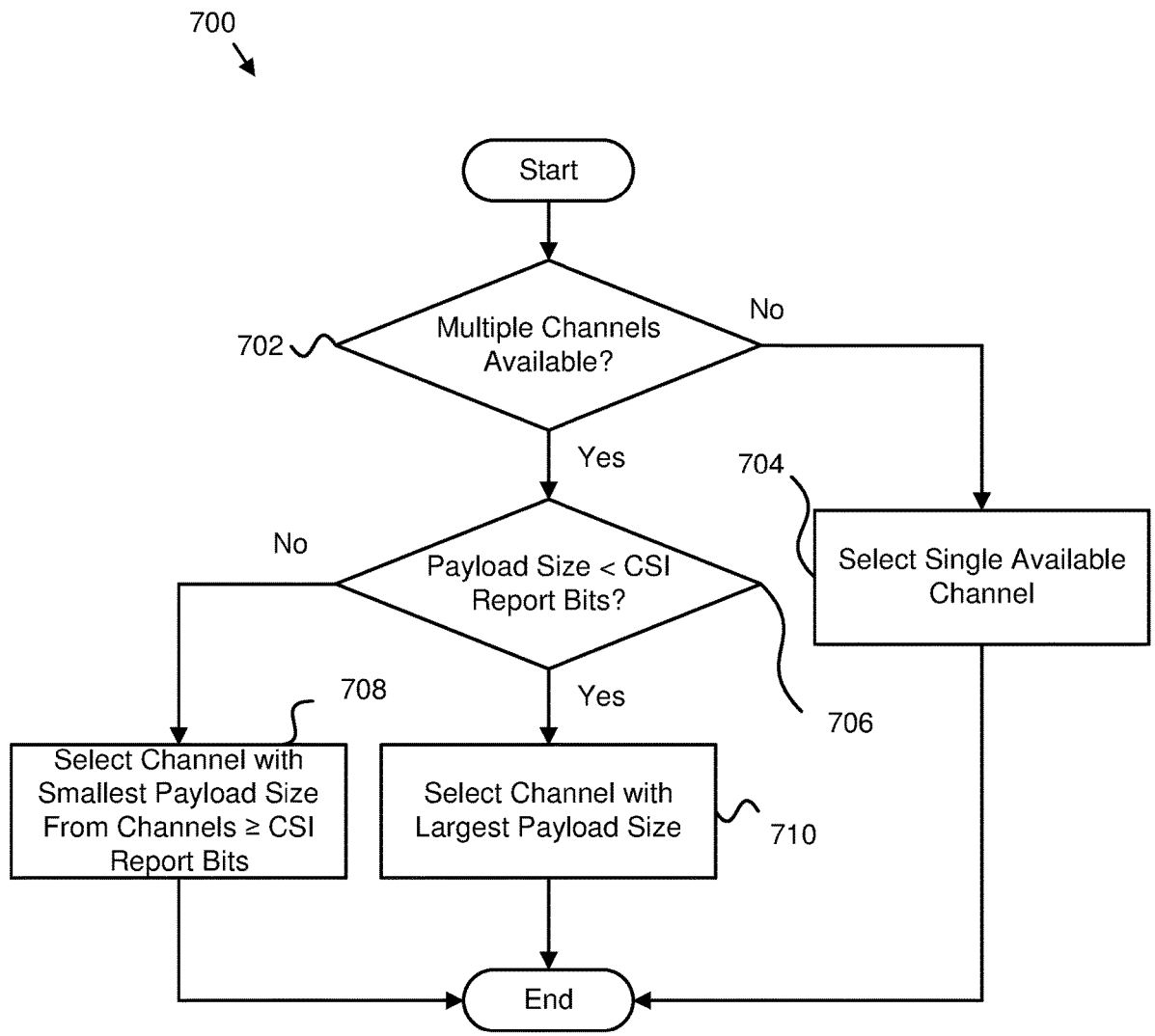
FIG. 7 is a schematic flow chart diagram illustrating one embodiment of a method for selecting a channel for CSI reporting.

FIG. 7 is a schematic flow chart diagram illustrating one embodiment of a method for selecting a channel for CSI reporting. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

The method 700 may include determining 702 whether multiple channels are available for transmission of multiple CSI repots in a subframe. In certain embodiments, one channel refers to one channel structure on a time-frequency resource (e.g., a PUCCH format 4 in some designated PUCCH format 4 time-frequency resource). If there are not multiple channels available for selection (e.g., there is only one channel available for selection), the method 700 may include selecting 704 a single available channel, then the method 700 may end.

If there are multiple channels available for selection, the method 700 may include determining 706 whether the payload size of each channel of the multiple channels is less than a number of CSI report bits corresponding to all of the CSI reports in a same reporting instance (e.g., the sum of the CSI report bits for each of the CSI reports available for transmission in a subframe). If the payload size of one or more channels of the multiple channels is greater than or equal to the number of CSI report bits corresponding to all of the CSI reports in the same reporting instance, the method 700 may select 708 a channel with the smallest payload size from the one or more channels having a payload size greater than or equal to the number of CSI report bits corresponding to all of the CSI reports in the same reporting instance, then the method 700 may end. For example, if the sum of all CSI report bits is 65, and there are four channels having respective payload sizes of 30, 45, 65, and 80, the method 700 will select 708 the channel with payload size 65. The selected channel is transmitted in the reporting instance, carrying one or more of the CSI reports available for transmission in the reporting instance.

If the payload size of each of the multiple channels is less than the number of CSI report bits corresponding to all of the CSI reports in the same reporting instance, the method 700 may select 710 a channel with the latest payload size from the multiple channels, then the method 700 may end. For example, if the sum of all CSI report bits is 65, and there are four channels having respective payload sixes of 30, 45, 50, and 60, the method 700 will select 710 the channel with payload size 60. The selected channel is transmitted in the reporting instance, carrying one or more of the CSI reports available for transmission in the repotting instance.

Figure 8:
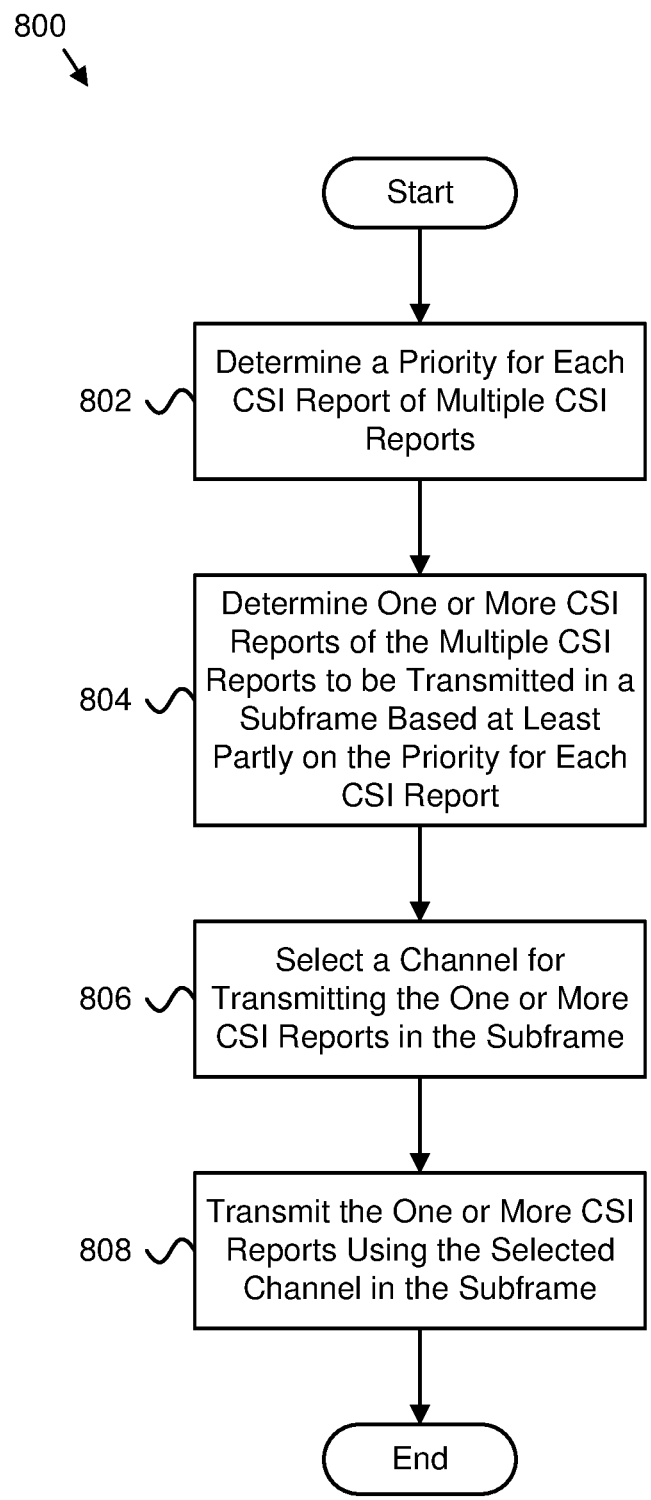
FIG. 8 is a schematic flow chart diagram illustrating one embodiment of a method for CSI reporting.

FIG. 8 is a schematic flow chart diagram illustrating one embodiment of a method 800 for CSI reporting. In some embodiments, the method 800 is performed by an apparatus, such as a remote unit 102. In certain embodiments, the method 800 may be performed by a processor executing program code, for example, a microcontroller, a microprocessor, a CPU, a GPU, an auxiliary processing unit, a FPGA, or the like.

The method 800 may include determining 802 a priority for each CSI report of multiple CSI reports. In certain embodiments, the priority for each CSI report is determined based on each of a CSI report type, a serving cell, a CSI process ID, and a CSI subframe set of the CSI report. In various embodiments, the processor 202 may determine 802 the priority for each CSI report of the multiple CSI reports. In some embodiments, the priority for each CSI report may be determine using one of the following equations:

$$P_{CSI\text{-}priority}=n \times T \times S \times M + t \times S \times M + s \times M + m,$$

$$P_{CSI\text{-}priority}=n \times T \times S \times S + t \times M \times S + m \times S + s,$$

$$P_{CSI\text{-}priority}=n \times S \times T \times M + s \times T \times M + t \times M + m,$$

$$P_{CSI\text{-}priority}=n \times S \times M \times T + s \times M \times T + m \times T + t,$$

$$P_{CSI\text{-}priority}=n \times M \times S \times T + m \times S \times T + s \times T + t,$$

$$P_{CSI\text{-}priority}=n \times M \times T \times S + m \times T \times S + t \times S + s,$$

$$P_{CSI\text{-}priority}=m \times T \times S \times N + t \times S \times N + s \times N + n,$$

$$P_{CSI\text{-}priority}=m \times T \times N \times S + t \times N \times S + n \times S + s,$$

$$P_{CSI\text{-}priority}=m \times S \times T \times N + s \times T \times N + t \times N + n,$$

$$P_{CSI\text{-}priority}=m \times S \times N \times T + s \times N \times T + n \times T + t,$$

$$P_{CSI\text{-}priority}=m \times N \times S \times T + n \times S \times T + s \times T + t,$$

$$P_{CSI\text{-}priority}=m \times N \times T \times S + n \times T \times S + t \times S + s,$$

$$P_{CSI\text{-}priority}=s \times T \times N \times M + t \times N \times M + n \times M + m,$$

$$P_{CSI\text{-}priority}=s \times T \times M \times N + t \times M \times N + m \times N + n,$$

$$P_{CSI\text{-}priority}=s \times N \times T \times M + n \times T \times M + t \times M + m,$$

$$P_{CSI\text{-}priority}=s \times N \times M \times T + n \times M \times T + m \times T + t,$$

$$P_{CSI\text{-}priority}=s \times M \times N \times T + m \times N \times T + n \times T + t,$$

$$P_{CSI\text{-}priority}=s \times M \times T \times N + m \times T \times N + t \times N + n,$$

$$P_{CSI\text{-}priority}=t \times N \times S \times M + n \times S \times M + s \times M + m,$$

$$P_{CSI\text{-}priority}=t \times N \times M \times S + n \times M \times S + m \times S + s,$$

$$P_{CSI\text{-}priority}=t\times S\times N\times M+s\times N\times M+n\times M+m,$$

$$P_{CSI\text{-}priority}=t\times S\times M\times N+s\times M\times N+m\times N+n,$$

$$P_{CSI\text{-}priority}=t\times M\times S\times N+m\times S\times N+s\times N+n, \text{ and}$$

$$P_{CSI\text{-}priority}=t\times M\times N\times S+m\times N\times S+n\times S+s.$$

In certain embodiments, $P_{CSI\text{-}priority}$ is the priority for the CSI process; N is a number of different CSI report type levels; n is a CSI report type level index of the CSI report types and 0≤n≤N−1; M is a number of serving cells for a remote unit; m is a serving cell index of the CSI report and 0≤m≤M−1; S is a number of CSI processes for a serving cell and for a remote unit; s is a CSI process index of the CSI report and 0≤s≤S−1; T is a number of CSI subframe sets for a serving cell and for a remote unit; t is a CSI subframe set index of the CSI report and 0≤t≤T−1. In such an embodiment, priorities of the multiple CSI reports may be ordered from highest priority to lowest priority in ascending order of $P_{CSI\text{-}priority}$. In various embodiments, a CSI report for a serving cell may be configured without a CSI process ID. In such embodiments, a default CSI process index (e.g., s=0) may be assumed for such a CSI report. In other embodiments, a CSI report for a serving cell may be configured without CSI subframe sets. In such an embodiment, a default CSI subframe set index (e.g., t=0) may be assumed for such a CSI report.

The method 800 may also include determining 804 one or more CSI reports of the multiple CSI reports to be transmitted in a subframe based at least partly on the priority for each CSI report. In one embodiment the processor 202 may determine 804 the one or more CSI reports of the multiple CSI reports to be transmitted in the subframe. In various embodiments, determining 804 the one or more CSI reports of the multiple CSI reports to be transmitted in the subframe includes selecting CSI reports of the multiple CSI sports in order from a highest priority to a lowest priority until a size of the selected CSI reports reaches a payload size of a selected channel.

The method 800 may include selecting 806 a channel for transmitting the one or more CSI reports in the subframe. In some embodiments, the processor 202 may select 806 the channel for transmitting the one or more CSI reports in the subframe. In one embodiment, selecting 806 the channel includes, if a single channel is the only channel available for selection, selecting the single channel. In some embodiments, selecting 806 the channel includes, if multiple channels are available for selection and if a payload size of one or more channels of the multiple channels is greater than or equal to a number of CSI report bits corresponding to the multiple CSI reports, selecting the channel with a smallest payload size from the one or more channels. In various embodiments, selecting 806 the channel includes, if multiple channels are available for selection and if a payload size of each channel of the multiple channels is less than a number of CSI report bits corresponding to the multiple CSI reports, selecting the channel with a largest payload size from the multiple channels. In one embodiment, the method 800 may include receiving signaling that indicates at least one channel that can be used for transmitting the one or mom CSI reports in the subframe. In such embodiments, the receiver 212 may receive the signaling that indicates the at least one channel that can be used for transmitting the one or more CSI reports in the subframe.

The method 800 may include transmitting 808 the one or more CSI reports using the selected channel in the subframe, then the method 800 may end. In certain embodiments, the transmitter 210 may transmit 808 the one or more CSI reports using the selected channel in the subframe.

In one embodiment, the method 800 may include determining a set of HARQ-ACK bits to be transmitted in the subframe. In such an embodiment, determining 804 the one or more CSI reports of the multiple CSI reports to be transmitted in the subframe may include selecting CSI reports of the multiple CSI reports in order from a highest priority to a lowest priority until a size of the set of HARQ-ACK bits and the selected CSI reports reaches a payload size of the selected channel. Moreover, in a further embodiment, transmitting 808 the one or more CSI reports using the selected channel in the subframe may include transmitting the set of HARQ-ACK bits with the selected CSI reports using the selected channel.

Figure 9:
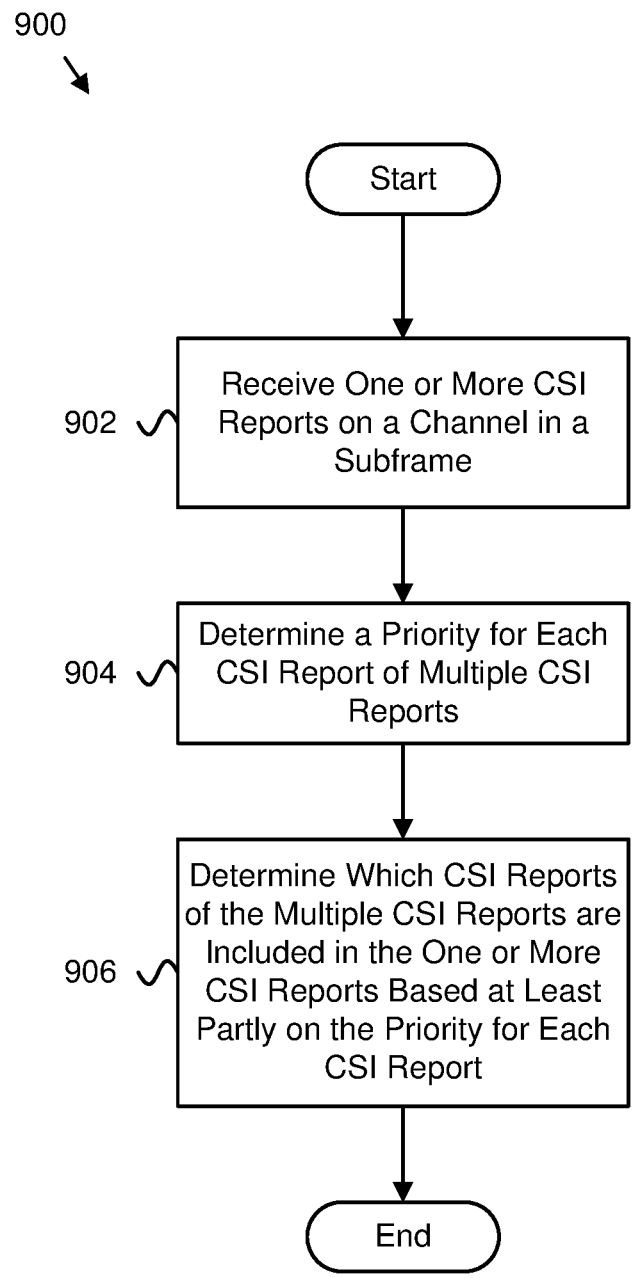
FIG. 9 is a schematic flow chart diagram illustrating another embodiment of a method for CSI reporting.

FIG. 9 is a schematic flow chart diagram illustrating another embodiment of a method 900 for CSI reporting. In some embodiments, the method 900 is performed by an apparatus, such as a base unit 104. In certain embodiments, the method 900 may be performed by a processor executing program code, for example, a microcontroller, a microprocessor, a CPU, a GPU, an auxiliary processing unit, a FPGA, or the like.

The method 900 may include receiving 902 one or more CSI reports on a channel in a subframe. In one embodiment, the receiver 312 may receive 902 the one or more CSI reports on the channel in the subframe. The method 900 may also include determining 904 a priority for each CSI report of multiple CSI reports. In certain embodiments, the priority for each CSI report is determined based on each of a CSI report type, a serving cell, a CSI process ID, and a CSI subframe set of the CSI report. In various embodiments, the processor 302 may determine 904 the priority for each CSI report of the multiple CSI reports. In some embodiments, the priority for each CSI report may be determine using one of the following equations:

$$P_{CSI\text{-}priority}=n\times T\times S\times M+t\times S\times M+s\times M+m,$$

$$P_{CSI\text{-}priority}=n\times T\times M\times S+t\times M\times S+m\times S+s,$$

$$P_{CSI\text{-}priority}=n\times S\times T\times M+s\times T\times M+t\times M+m,$$

$$P_{CSI\text{-}priority}=n\times S\times M\times T+s\times M\times T+m\times T+t,$$

$$P_{CSI\text{-}priority}=n\times M\times S\times T+m\times S\times T+s\times T+t,$$

$$P_{CSI\text{-}priority}=n\times M\times T\times S+m\times T\times S+t\times S+s,$$

$$P_{CSI\text{-}priority}=m\times T\times S\times N+t\times S\times N+s\times N+n,$$

$$P_{CSI\text{-}priority}=m\times T\times N\times S+t\times N\times S+n\times S+s,$$

$$P_{CSI\text{-}priority}=m\times S\times T\times N+s\times T\times N+t\times N+n,$$

$$P_{CSI\text{-}priority}=m\times S\times N\times T+s\times N\times T+n\times T+t,$$

$$P_{CSI\text{-}priority}=m\times N\times S\times T+n\times S\times T+s\times T+t,$$

$$P_{CSI\text{-}priority}=m\times N\times T\times S+n\times T\times S+t\times S+s,$$

$$P_{CSI\text{-}priority}=s\times T\times N\times M+t\times N\times M+n\times M+m,$$

$$P_{CSI\text{-}priority}=s\times T\times M\times N+t\times M\times N+m\times N+n,$$

$$P_{CSI\text{-}priority}=s\times N\times T\times M+n\times T\times M+t\times M+m,$$

$$P_{CSI\text{-}priority}=s\times N\times M\times T+n\times M\times T+m\times T+t,$$

$$P_{CSI\text{-}priority}=s\times M\times N\times T+m\times N\times T+n\times T+t,$$

$$P_{CSI\text{-}priority}=s\times M\times T\times N+m\times T\times N+t\times N+n,$$

$$P_{CSI\text{-}priority}=t\times N\times S\times M+n\times S\times M+s\times M+m,$$

$$P_{CSI\text{-}priority}=t\times N\times M\times S+n\times M\times S+m\times S+s,$$

$$P_{CSI\text{-}priority}=t\times S\times N\times M+s\times N\times M+n\times M+m,$$

$$P_{CSI\text{-}priority}=t\times S\times M\times N+s\times M\times N+m\times N+n,$$

$$P_{CSI\text{-}priority}=t\times M\times S\times N+m\times S\times N+s\times N+n,\text{ and}$$

$$P_{CSI\text{-}priority}=t\times M\times N\times S+m\times N\times S+n\times S+s.$$

In certain embodiments, $P_{CSI\text{-}priority}$ is the priority for the CSI process; N is a number of different CSI report type levels; n is a CSI report type level index of the CSI report, types and $0\leq n\leq N-1$; M is a number of serving ceils for a remote unit; m is serving cell index of the CSI report and $0\leq m\leq M-1$; S is a number of CSI processes for a serving cell and for a remote unit; s is a CSI process index of the CSI report and $0\leq s\leq S-1$; T is a number of CSI subframe sets for a serving cell and for a remote unit; t is a CSI subframe set index of the CSI report and $0\leq t\leq T-1$. In such an embodiment, priorities of the multiple CSI reports may be ordered from highest priority to lowest priority in ascending order of $P_{CSI\text{-}priority}$. In various embodiments, a CSI report for a serving cell may be configured without a CSI process ID. In such embodiments, a default CSI process index (e.g., s=0) may be assumed for such a CSI report. In other embodiments, a CSI report for a serving cell may be configured without CSI subframe sets. In such an embodiment, a default CSI subframe set index (e.g., t=0) may be assumed tor such a CSI report.

The method 900 may also include determining 906 which CSI reports of the multiple CSI reports are included in the one or more CSI reports based at least partly on the priority for each CSI report, then the method 900 may end. In one embodiment, the processor 302 may determine 906 which CSI reports of the multiple CSI reports are included in the one or more CSI reports based at least partly on the priority for each CSI report.

In certain embodiments, determining 906 which CSI reports of the multiple CSI reports are part of the one or more CSI reports includes selecting CSI reports of the multiple CSI imports in order from a highest priority to a lowest priority until a number of the one or more CSI reports reaches a payload size of the channel. In various embodiments, the method 900 may include transmitting signaling that indicates at least one channel that can be used for transmitting the one or more CSI reports in the subframe. Moreover, in some embodiments, the method 900 may include receiving a set of HARQ-ACK bits with the one or more CSI reports on the channel. In such embodiments, determining 906 which CSI reports of the multiple CSI reports are included in the one or more CSI reports may include selecting CSI reports of the multiple reports in order from a highest priority to a lowest priority until a size of the set of HARQ-ACK bits and a number of the one or more CSI reports reaches a payload size of the channel.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a processor that:
determines a priority for each channel state information ("CSI") report of a plurality of CSI reports, wherein the priority for each CSI report is determined based on each of a CSI report type, a serving cell, a CSI process identification ("ID"), and a CSI subframe set of the CSI report;
determines one or more CSI reports of the plurality of CSI reports to be transmitted in a subframe based at least partly on the priority for each CSI report; and
selects a channel from one or more channels of a plurality of channels available for selection based on a payload size of the channel for transmitting the one or more CSI reports in the subframe; and
a transmitter that transmits the one or more CSI reports using the selected channel in the subframe.

2. The apparatus of claim 1, wherein the priority for each CSI report is determined using one of the following equations:

$$P_{CSI\text{-}priority}=n\times T\times S\times M+t\times S\times M+s\times M+m,$$

$$P_{CSI\text{-}priority}=n\times T\times S\times S+t\times M\times S+m\times S+s,$$

$$P_{CSI\text{-}priority}=n\times S\times T\times M+s\times T\times M+t\times M+m,$$

$$P_{CSI\text{-}priority}=n\times S\times M\times T+s\times M\times T+m\times T+t,$$

$$P_{CSI\text{-}priority}=n\times M\times S\times T+m\times S\times T+s\times T+t,$$

$$P_{CSI\text{-}priority}=n\times M\times T\times S+m\times T\times S+t\times S+s,$$

$$P_{CSI\text{-}priority}=m\times T\times S\times N+t\times S\times N+s\times N+n,$$

$$P_{CSI\text{-}priority}=m\times T\times N\times S+t\times N\times S+n\times S+s,$$

$$P_{CSI\text{-}priority}=m\times S\times T\times N+s\times T\times N+t\times N+n,$$

$$P_{CSI\text{-}priority}=m\times S\times N\times T+s\times N\times T+n\times T+t,$$

$$P_{CSI\text{-}priority}=m\times N\times S\times T+n\times S\times T+s\times T+t,$$

$$P_{CSI\text{-}priority}=m\times N\times T\times S+n\times T\times S+t\times S+s,$$

$$P_{CSI\text{-}priority}=s\times T\times N\times M+t\times N\times M+n\times M+m,$$

$$P_{CSI\text{-}priority}=s\times T\times M\times N+t\times M\times N+m\times N+n,$$

$$P_{CSI\text{-}priority}=s\times N\times T\times M+n\times T\times M+t\times M+m,$$

$$P_{CSI\text{-}priority}=s\times N\times M\times T+n\times M\times T+m\times T+t,$$

$$P_{CSI\text{-}priority}=s\times M\times N\times T+m\times N\times T+n\times T+t,$$

$$P_{CSI\text{-}priority}=s\times M\times T\times N+m\times T\times N+t\times N+n,$$

$$P_{CSI\text{-}priority}=t\times N\times S\times M+n\times S\times M+s\times M+m,$$

$$P_{CSI\text{-}priority}=t\times N\times M\times S+n\times M\times S+m\times S+s,$$

$$P_{CSI\text{-}priority}=t\times S\times N\times M+s\times N\times M+n\times M+m,$$

$$P_{CSI\text{-}priority}=t\times S\times M\times N+s\times M\times N+m\times N+n,$$

$$P_{CSI\text{-}priority}=t\times M\times S\times N+m\times S\times N+s\times N+n,\text{ and}$$

$$P_{CSI\text{-}priority}=t\times M\times N\times S+m\times N\times S+n\times S+s;$$

wherein $P_{CSI\text{-}priority}$ is the priority for the CSI report; N is a number of different CSI report type levels; n is a CSI report type level index of the CSI report types and 0≤n≤N−1; M is a number of serving cells for a remote unit; m is a serving cell index of the CSI report and 0≤m≤M−1; S is a number of CSI processes for a serving cell and for a remote unit; s is a CSI process index of the CSI report and 0≤s≤S−1; T is a number of CSI subframe sets for a serving cell and for a remote unit; t is a CSI subframe set index of the CSI report and 0≤t≤T−1.

3. The apparatus of claim 2, wherein priorities of the plurality of CSI reports are ordered from highest priority to lowest priority in ascending order of $P_{CSI\text{-}priority}$.

4. The apparatus of claim 1, wherein the processor determines the one or more CSI reports of the plurality of CSI reports to be transmitted in the subframe by selecting CSI reports of the plurality of CSI reports in order from a highest priority to a lowest priority until a size of the selected CSI reports reaches a payload size of the selected channel.

5. The apparatus of claim 1, comprising a receiver that receives signaling that indicates at least one channel that can be used for transmitting the one or more CSI reports in the subframe.

6. The apparatus of claim 1, wherein the processor selects the channel by, if a single channel is the only channel available for selection, selecting the single channel.

7. The apparatus of claim 1, wherein the processor selects the channel by, if the payload size of the one or more channels is greater than or equal to a number of CSI report bits corresponding to the plurality of CSI reports, selecting the channel with a smallest payload size from the one or more channels.

8. The apparatus of claim 1, wherein the processor selects the channel by, if the payload size of each channel of the plurality of channels is less than a number of CSI report bits corresponding to the plurality of CSI reports, selecting the channel with a largest payload size from the plurality of channels.

9. The apparatus of claim 1, wherein the processor determines a set of hybrid automatic repeat request acknowledgment ("HARQ-ACK") bits to be transmitted in the subframe, and wherein the processor determines the one or more CSI reports of the plurality of CSI reports to be transmitted in the subframe by selecting CSI reports of the plurality of CSI reports in order from a highest priority to a lowest priority until a size of the set of HARQ-ACK bits and the selected CSI reports reaches a payload size of the selected channel, and wherein the transmitter transmits the one or more CSI reports using the selected channel in the subframe by transmitting the set of HARQ-ACK bits with the selected CSI reports using the selected channel.

10. A method comprising:
   determining a priority for each channel state information ("CSI") report of a plurality of CSI reports, wherein the priority for each CSI report is determined based on each of a CSI report type, a serving cell, a CSI process identification ("ID"), and a CSI subframe set of the CSI report;
   determining one or more CSI reports of the plurality of CSI reports to be transmitted in a subframe based at least partly on the priority for each CSI report; and
   selecting a channel from one or more channels of a plurality of channels available for selection based on a payload size of the channel for transmitting the one or more CSI reports in the subframe; and
   transmitting the one or more CSI reports using the selected channel in the subframe.

11. The method of claim 10, wherein the priority between any pair of CSI reports among the plurality of CSI reports is determined according to:
   if the two CSI reports in the pair of CSI reports have a different CSI report type level index, the CSI report with a smaller CSI report type level index is of higher priority;
   if the two CSI reports in the pair of CSI reports have a same CSI report type level index and a different CSI subframe set index, the CSI report with a smaller CSI subframe set index is of higher priority;
   if the two CSI reports in the pair of CSI reports have a same CSI report type level index, a same CSI subframe set index, and a different CSI process index, the CSI report with a smaller CSI process index is of higher priority; and
   if the two CSI reports in the pair of CSI reports have a same CSI report type level index, a same CSI subframe set index, a same CSI process index, and a different serving cell index, the CSI report with a smaller serving cell index is of higher priority.

12. An apparatus comprising:
   a receiver that receives one or more channel state information ("CSI") reports on a channel in a subframe, wherein the channel is selected from one or more channels of a plurality of channels available for selection based on a payload size of the channel; and
   a processor that:
      determines a priority for each CSI report of a plurality of CSI reports, wherein the priority for each CSI report is determined based on each of a CSI report type, a serving cell, a CSI process identification ("ID"), and a CSI subframe set of the CSI report; and
      determines which CSI reports of the plurality of CSI reports are included in the one or more CSI reports based at least partly on the priority for each CSI report.

13. The apparatus of claim 12, wherein the priority for each CSI report is determined using one of the following equations:

$$P_{CSI\text{-}priority}=n \times T \times S \times M + t \times S \times M + s \times M + m,$$

$$P_{CSI\text{-}priority}=n \times T \times S \times S + t \times M \times S + m \times S + s,$$

$$P_{CSI\text{-}priority}=n \times S \times T \times M + s \times T \times M + t \times M + m,$$

$$P_{CSI\text{-}priority}=n \times S \times M \times T + s \times M \times T + m \times T + t,$$

$$P_{CSI\text{-}priority}=n \times M \times S \times T + m \times S \times T + s \times T + t,$$

$$P_{CSI\text{-}priority}=n \times M \times T \times S + m \times T \times S + t \times S + s,$$

$$P_{CSI\text{-}priority}=m \times T \times S \times N + t \times S \times N + s \times N + n,$$

$$P_{CSI\text{-}priority}=m \times T \times N \times S + t \times N \times S + n \times S + s,$$

$$P_{CSI\text{-}priority}=m \times S \times T \times N + s \times T \times N + t \times N + n,$$

$$P_{CSI\text{-}priority}=m \times S \times N \times T + s \times N \times T + n \times T + t,$$

$$P_{CSI\text{-}priority}=m \times N \times S \times T + n \times S \times T + s \times T + t,$$

$$P_{CSI\text{-}priority}=m \times N \times T \times S + n \times T \times S + t \times S + s,$$

$$P_{CSI\text{-}priority}=s \times T \times N \times M + t \times N \times M + n \times M + m,$$

$$P_{CSI\text{-}priority}=s \times T \times M \times N + t \times M \times N + m \times N + n,$$

$$P_{CSI\text{-}priority}=s \times N \times T \times M + n \times T \times M + t \times M + m,$$

$P_{CSI\text{-}priority}=s\times N\times M\times T+n\times M\times T+m\times T+t,$ $P_{CSI\text{-}priority}=s\times M\times N\times T+m\times N\times T+n\times T+t,$ $P_{CSI\text{-}priority}=s\times M\times T\times N+m\times T\times N+t\times N+n,$ $P_{CSI\text{-}priority}=t\times N\times S\times M+n\times S\times M+s\times M+m,$ $P_{CSI\text{-}priority}=t\times N\times M\times S+n\times M\times S+m\times S+s,$ $P_{CSI\text{-}priority}=t\times S\times N\times M+s\times N\times M+n\times M+m,$ $P_{CSI\text{-}priority}=t\times S\times M\times N+s\times M\times N+m\times N+n,$ $P_{CSI\text{-}priority}=t\times M\times S\times N+m\times S\times N+s\times N+n,$ and $P_{CSI\text{-}priority}=t\times M\times N\times S+m\times N\times S+n\times S+s;$ wherein $P_{CSI\text{-}priority}$ is the priority for the CSI report; N is a number of different CSI report type levels; n is a CSI report type level index of the CSI report and $0 \leq n \leq N-1$; M is a number of serving cells for a remote unit; m is a serving cell index of the CSI report and $0 \leq m \leq M-1$; S is a number of CSI processes for a serving cell and for a remote unit; s is a CSI process index of the CSI report and $0 \leq s \leq S-1$; T is a number of CSI subframe sets for a serving cell and for a remote unit; t is CSI subframe set index of the CSI report and $0 \leq t \leq T-1$.

14. The apparatus of claim 13, wherein priorities of the plurality of CSI reports are ordered from highest priority to lowest priority in ascending order of $P_{CSI\text{-}priority}$.

15. The apparatus of claim 12, wherein the processor determines which CSI reports of the plurality of CSI reports are included in the one or more CSI reports by selecting CSI reports of the plurality of CSI reports in order from a highest priority to a lowest priority until a number of the one or more CSI reports reaches a payload size of the channel.

16. The apparatus of claim 12, comprising a transmitter that transmits signaling that indicates at least one channel that can be used for transmitting the one or more CSI reports in the subframe.

17. The apparatus of claim 12, wherein the receiver receives a set of hybrid automatic repeat request acknowledgment ("HARQ-ACK") bits with the one or more CSI reports on the channel.

18. The apparatus of claim 17, wherein the processor determines which CSI reports of the plurality of CSI reports are included in the one or more CSI reports by selecting CSI reports of the plurality of CSI reports in order from a highest priority to a lowest priority until a size of the set of HARQ-ACK bits and a number of the one or more CSI reports reaches a payload size of the channel.

19. A method comprising:
receiving one or more channel state information ("CSI") reports on a channel in a subframe, wherein the channel is selected from one or more channels of a plurality of channels available for selection based on a payload size of the channel;
determining a priority for each CSI report of a plurality of CSI reports, wherein the priority for each CSI report is determined based on each of a CSI report type, a serving cell, a CSI process identification ("ID"), and a CSI subframe set of the CSI report; and
determining which CSI reports of the plurality of CSI reports are included in the one or more CSI reports based at least partly on the priority for each CSI report.

20. The method of claim 19, wherein the priority between any pair of CSI reports among the plurality of CSI reports is determined according to:
if the two CSI reports in the pair of CSI reports have a different CSI report type level index, the CSI report with a smaller CSI report type level index is of higher priority;
if the two CSI reports in the pair of CSI reports have a same CSI report type level index and a different CSI subframe set index, the CSI report with a smaller CSI subframe set index is of higher priority;
if the two CSI reports in the pair of CSI reports have a same CSI report type level index, a same CSI subframe set index, and a different CSI process index, the CSI report with a smaller CSI process index is of higher priority;
if the two CSI reports in the pair of CSI reports have a same CSI report type level index, a same CSI subframe set index, a same CSI process index, and a different serving cell index, the CSI report with a smaller serving cell index is of higher priority.

* * * * *